(12) United States Patent
Bassa et al.

(10) Patent No.: US 11,506,415 B2
(45) Date of Patent: Nov. 22, 2022

(54) LIBRARIES, SYSTEMS, AND METHODS FOR MINIMIZING AIR POLLUTION IN ENCLOSED STRUCTURES

(71) Applicant: URECSYS—URBAN ECOLOGY SYSTEMS—INDOOR AIR QUALITY MANAGEMENT LTD., Jerusalem (IL)

(72) Inventors: Nir Bassa, Jerusalem (IL); Kobi Richter, Arsuf (IL); Shimon Amit, Jerusalem (IL)

(73) Assignee: URECSYS—URBAN ECOLOGY SYSTEMS—INDOOR AIR QUALITY MANAGEMENT LTD., Jerusalem (IL)

( * ) Notice: Subject to any disclaimer, the term of this patent is extended or adjusted under 35 U.S.C. 154(b) by 252 days.

(21) Appl. No.: 16/775,556

(22) Filed: Jan. 29, 2020

(65) Prior Publication Data

US 2020/0240668 A1    Jul. 30, 2020

Related U.S. Application Data

(60) Provisional application No. 62/798,027, filed on Jan. 29, 2019.

(51) Int. Cl.
*F24F 11/64* (2018.01)
*F24F 11/46* (2018.01)
*G05B 13/02* (2006.01)
*F24F 3/16* (2021.01)
*F24F 11/00* (2018.01)
*F24F 110/65* (2018.01)

(52) U.S. Cl.
CPC ............ *F24F 11/64* (2018.01); *F24F 3/16* (2013.01); *F24F 11/0001* (2013.01); *F24F 11/46* (2018.01); *G05B 13/028* (2013.01); *F24F 2011/0002* (2013.01); *F24F 2110/65* (2018.01)

(58) Field of Classification Search
CPC ....... F24F 11/64; F24F 3/16; F24F 2011/0002
USPC ........................................................ 700/276
See application file for complete search history.

(56) References Cited

U.S. PATENT DOCUMENTS

2015/0168964 A1*  6/2015 Wu .................. G05D 23/1917
                                                              700/276
2018/0087790 A1*  3/2018 Perez .................... F24F 11/56
2018/0313557 A1* 11/2018 Turney .................. F24F 11/64

\* cited by examiner

*Primary Examiner* — Jigneshkumar C Patel
(74) *Attorney, Agent, or Firm* — Guy Levi, The IP Law Firm of Guy Levi LLC

(57) ABSTRACT

The disclosure relates to libraries used in conjunction with integrated ventilation and temperature controls for enclosed structures. Specifically, the disclosure is directed to libraries, systems and methods for minimizing pollution while simultaneously conserving energy and maintaining required levels of fresh air inside a multi-storied structure and its internal spaces, in an optimal manner, utilizing dynamic, user-defined threshold values and implementing strategies based on user defined goals.

42 Claims, 7 Drawing Sheets

LIBRARIES, SYSTEMS, AND METHODS FOR MINIMIZING AIR POLLUTION IN ENCLOSED STRUCTURES

RELATED APPLICATION

This application claims the priority from US Provisional Application having Ser. No. 62/798,027, filed on Jan. 29, 2019, which are incorporated herein by reference for all purposes.

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to libraries used in conjunction with integrated ventilation and temperature controls for enclosed structures. Specifically, the disclosure is directed to libraries, systems and methods for minimizing pollution inside an enclosed structure in an optimal manner, combined with minimizing energy requirement and maintaining required levels of fresh air, utilizing dynamic and adaptive, user-defined ventilation criteria.

Climate change, environmental standards and diminishing land resources compelled modern architecture standards to design and build ever higher structures. These structures retain their value based on superior structural integrity and, as energy prices continue to rise, are more energy efficient. Due to the construction of the building envelope, these buildings may or may not shield the occupant from negative infiltration of outdoor pollutants, for example, pollen, dust, humidity and the like.

However, occupants, operators and owners of such structures also want to be comfortable and free from the risk of exposure to any indoor pollutants that may cause, for example, health problems. Buildings having superior structural integrity, require frequent ventilation of outside air to maintain, for example levels of fresh $O_2$, and reduce levels of $CO_2$ within the structures. Ventilation inside buildings (opening of windows and door, active ventilation, etc.), occurs chiefly during the working hours, times when the urban air is most polluted. Thus, air pollution from the outside is introduced into the buildings.

Moreover, in the effort to operate the buildings at efficient heating and cooling parameters, these buildings and enclosed structures are being constructed as ever-increasing insulated systems, with fixed regulation-based parameters on timing and various pollutants' concentrations within the structures.

Hence, there is a need for more effective and efficient means for determining the optimal conditions for ventilating these enclosed structures.

SUMMARY

Disclosed, in various embodiments, are libraries, systems, methods and computer readable media for minimizing pollution inside an enclosed structure, combined with minimizing energy requirement and maintaining required levels of fresh air in an optimal manner, utilizing dynamic and adaptive, user-defined ventilation criteria. More specifically, provided herein are libraries and methods of providing instructions to an integral HVAC system in a multi-storied, enclosed structure for ventilating the structure in a manner that will maintain preselected parameters, whether user defined or regulation based.

The present invention provides means for integrating and optimizing different and sometimes conflicting requirements in real time: Maintenance of fresh air supply to the building, reduction of indoor air pollution concentrations and energy conservation. The system can calculate a quantified weighted combination of different conflicting requirements. In some embodiments provided herein, the system can calculate a single value which takes into account all the considerations and requirements. Furthermore, in some embodiments of the present invention, the system and method utilize threshold values. Instead of utilizing static/fixed predetermined thresholds, the present system and method utilize dynamic thresholds which take into account the dynamic changes of air pollution levels in real time and combine them with fresh air and energy requirements in order to calculate a value or values that control the ventilation system. These calculated optimal values determine the increasing/decreasing of fresh air ventilation into the multi-storied structure. Moreover, in some embodiments provided herein the system can estimate and calculate the dynamic threshold values without using indoor air pollution measurements, but only using historical data of outdoor air pollution measurements, ventilation history, models of gas dynamics, e.g., diffusion and rate of decomposition, heuristics and/or machine learning methods, and/or statistical methods.

In certain exemplary implementation. provided herein is a processor-accessible library comprising control information for a multi-storied structure's heating, ventilation and air conditioning (HVAC) process, wherein the library contains data and executable commands configured, when executed, to identify optimized period for ventilation and/or heating and air conditioning, and wherein the data incorporate external and internal HVAC parameters.

In another embodiment, provided herein is a computerized method for optimizing heating, ventilation and air conditioning (HVAC) process in a multi-storied structure implementable in a system comprising the multi-storied structure, a heating, ventilation and air conditioning (HVAC) system, a processing module in communication with a non-volatile memory having thereon a processor-readable media and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects, linked to the first, second, and third ventilation-associated parameters as well as to the heating and air-conditioning associated parameter related to the internal and external temperature of the multi-storied structure; the method comprising: responsive to a ventilation prompt, selecting a set of operations configured to achieve a predetermined master process' optimization objective from the plurality of objectives in the library; associating the selected set of operations to create a set of process commands within the ventilation request and forming a ventilation command, wherein the set of master process objects in the library are linked to the ventilation command without copying the set of master process objects into the ventilation command; and executing the ventilation command.

In yet another embodiment, provided herein is a processor-readable media in communication with and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises data and information associated with a single objective associated with a plurality of master process sub-goals, linked to the first, second, and third ventilation-associated parameters as well as to the heating and air-conditioning associated parameter related to the internal and external temperature of the multi-storied structure, the processor-readable media having a set of executable instructions, which, when executed, are configured to cause a processor to: receive a ventilation request prompt from a heating, ventilation and air conditioning (HVAC) system; responsive to the ventilation request, select a set of operations configured to achieve a predetermined master process' optimization objective from the plurality of master process' optimization objectives; associate the selected set of operations with the ventilation request; create a set of process commands within the ventilation request; form a ventilation command, wherein the set of master process objects in the library are linked to the ventilation command without copying the master process objects into the ventilation command; and execute the set of ventilation associated process objects in the ventilation command.

In another embodiment, provided herein is a method to control the state of an HVAC system in order to actuate a predefined optimization strategy designed to pursue a predefined optimization objective while subject to predefined prerequisites, utilizing the content of linked data bases featuring various parameters, among which at least one is continuously updated through an input channel.

The prerequisites can be defined according to the custom requirements of the user. These may be, for example, that the HVAC system will comply with certain regulation or standard of ventilation; that the average outdoor airflow within some custom period of time will be no less than some custom value; that the concentration of $CO_2$ will not exceed some defined value, that certain air pressure difference will be maintained between different zones of the structure and between the indoor and outdoor air and so forth. At any case some prerequisite is defined related to a minimal mandatory supply of outdoor air to the multi-storied enclosed structure.

The data bases can be configured to contain one ventilation-associated parameter (VAP3) representing the temporal history of states of the HVAC system, as well as one ventilation-associated parameter (VAP2) related to the temporal history of concentration of one contaminant of interest or a combination of several contaminants, measured or estimated, in the outdoor air which was supplied to the building by the HVAC system. Furthermore, the library comprises a complete set of parameters required to carry the computation defined by the optimization strategy and to verify compliance with each of the defined prerequisites. These may comprise, for example, various parameters of the building itself and of the characteristic activity in it.

The optimization objective can be a weighted combination of multiple sub-goals, for example, minimizing the contamination of the indoor air by outdoor sources and minimizing the energy requirement by the HVAC system.

The optimization strategy used in the methods provided can be configured to calculate a dynamic threshold value (DTV), which is based on a weighted combination of values of VAP2 during previous ventilation events indicated by VAP3. That value is further operated on based on an estimate of the expected instantaneous energy requirement by the HVAC system in case of ventilation of the multi-storied enclosed structure, with a monotonic decrease of the DTV with that energy requirement. The magnitude of the decrease is determined by the respective weights of the sub-goals within the optimization objective.

In addition, in the methods provided, a comparison is made in certain operable examples, between the current value of VAP2, and the DTV. Ventilation will occur when VAP2 is, for example, smaller than or equals to DTV. Otherwise, ventilation will stop providing that this stoppage is not expected to cause violation of certain defined prerequisites.

The directives implemented by the optimization strategy, and executed by the processing module, can be actuated by a control unit which is physically connected to the HVAC system and with which the processing unit has a local or remote communication channel.

Data created during the processing and actuation of the optimization objective may continuously be fed back into the data bases, in order to serve in the following processing or in the monitoring of the system.

In certain embodiments, the dynamic threshold can be further operated on according to the prerequisites (e.g. increase of the threshold as current conditions in the multi-storied enclosed structure are approaching conditions where ventilation is mandatory according to the prerequisites).

Furthermore, in certain embodiments the weights of the sub-goals within the optimization objective are adjusted dynamically according to user-defined criteria (for example, lower weight to indoor air quality and higher weight to energy saving when the occupancy is low and the opposite when it is high).

In certain exemplary implementation, the dynamic threshold can further be operated on according to a prediction of expected values of, for example, VAP2 in the near future (for example, within the next minute, hour, day, etc.).

In certain exemplary implementations, the dynamic threshold can further be operated on according to expected energy requirement by the fresh air system in case of ventilation in each instant in the near future, considering the forecasted weather parameters such as temperature and relative humidity, and a model of the effect of these parameters on energy requirement in the structure.

In another embodiment, another ventilation associated parameter (VAP1) can be defined in the library, and be associated with a measurement or estimation of the concentration of one or more substances (e.g., NOx) in the indoor air. The DTV can then be calculated and determined based on the current value of VAP1 and other prediction tools.

In yet another embodiment, the dynamic threshold can further be calculated based on chemical, physical or computational model(s) of the flow dynamics and disintegration kinetics of gas and other airborne materials inside the building, considering the influence of at least one of the HVAC system activity, the influence of biological activity, and the influence of any other kind of activity inside the building.

In certain exemplary implementation, the optimization objective further comprises a sub-goal of minimization of erosion and/or contamination of the indoor air as a result of indoor processes or indoor gas components, such as accumulation of CO2, dwindling of O2, accumulation of indoor pollutants such as volatile organic compounds (VOC), appearance of offensive odors or some combination comprising the foregoing.

In such case, the dynamic threshold can further be calculated, for example, based on an estimation of the indoor air contamination and/or erosion due to indoor processes, based on the recent values of the parameter VAP3 and on some parameters of the multi storied enclosed structure, and on the human activity within, as appear in the data bases.

In another embodiment, the optimization objective can further comprise more than one sub-goal of minimizing average concentration of contaminant of outdoor source. Accordingly, the DTV is then calculated based on combination of recent values of VAP2 for all the contaminants of interest. In addition, the DTV is then compared to an index calculated based on a weighted combination of the current values of VAP2 for all the contaminants of interest. The weights in both combinations can be determined according to the corresponding weights in the optimization objective.

In yet another embodiment, additional parameters can be defined in the data library, associated with data such as at least one of pollution levels at locations that are remote to the enclosed structure, occupancy of the building, meteorological, traffic, etc. and possibly updated through additional input channels. These parameters can be used by the optimization strategy uploaded to the processing module of the system.

In certain exemplary implementation where the decision space is binary (i.e. where the outdoor airflow can only be turned on or off), the outdoor airflow at the 'on' configuration can further be adapted dynamically according to variable conditions, for example changes in the outdoor humidity and temperature and the indoor set temperature. The flow can then be set to the maximum possible levels at the current conditions, where the system is still safe from excessive accumulation of liquid water in it.

In another embodiment, the HVAC system may modulate the outdoor air flow among multiple values. Accordingly, the prerequisites can further comprise the maximum outdoor airflow allowed as a function of outdoor temperature and humidity.

In yet another embodiment, the optimization strategy logic is not based on a comparison between a threshold value and VAP2 but rather on a predictive search strategy. Thus the dynamic ventilation criteria are not limited to the DTV.

In certain exemplary implementation, the system will activate ventilation into unoccupied zones, also during times when the entire structure is unoccupied. This, in cases when the optimization strategy finds that such ventilation may lead to net reduction of energy requirement or to reduction of indoor air pollution levels during occupancy times.

In certain exemplary implementation, the system will activate, deactivate and tune various components of thermal treatment in the HVAC system, so as to improve energy efficiency of the HVAC system. Such components can be, for example, chillers, heat-pumps, fancoils, heating coils, heat exchangers, cooling towers, water pumps, engines, fans, compressors etc. For example, at times when it is detected that certain components are operating under partial load, redundant components may be turned off (for example, when low cooling capacity is required from a battery of several water chillers, some of these chillers may be turned off, until the required cooling capacity becomes high again).

As another example, the system may automatically tune the temperature set point of the fresh air system when operating during times when the structure is not occupied, in a manner that may lead to better outcome with respect to the optimization objective. For example, (during seasons when the indoor environment is kept warmer than the outdoor) heating of cold fresh air may be reduced and, in some cases even altogether stopped during night times, while still maintaining the required indoor temperature during occupancy times.

In certain exemplary implementation, the system will control baffles and dumpers affecting outdoor air flow distribution between different sub-zones in the structure, leading to better outcome with respect to the optimization objective. As an example, outdoor airflow to a zone may be tuned in response to the occupancy of the zone, reducing the energy requirement by the system when occupancy reduces and restoring it as occupancy grows again. As another example, outdoor airflow into zones where the occupancy is found to be low may be increased when it is predicted that the outdoor air pollution is about to increase and before the pollution levels rise above a dynamic threshold. This allows longer stoppage or reduction of outdoor air supply to the entire structure when the outdoor pollution subsequently rises.

In certain exemplary implementation, the system may control exhaust ventilation air flow while controlling the fresh air airflow, in order to comply with a prerequisite of a required air pressure differences between certain zones in the structure (e.g. toilets, kitchens etc.), the rest of the structure and the outdoor environment.

In certain exemplary implementation, the system may detect a faulty component of the HVAC system or an improper distribution of fresh air flow in the structure or in a sub space of it. Is such case, the system may issue an alert.

In certain exemplary implementation, the system further comprises a graphic user interface (GUI) configured to allow the user to selectably adjust the logic determining the weighting of the sub-goals within the selected optimization objective.

In certain exemplary implementation, the systems provided herein, using the libraries provided to implement the methods disclosed further comprises at least one of a multi-directional, and a direction-adjustable air-inlet module, adapted to provide selectable inflow of air from a discrete direction Further and in certain exemplary implementation, provided herein is a method for adaptive optimization of heating, ventilation and air conditioning (HVAC) process in a multi-storied structure implementable in a system comprising the multi-storied structure, a heating, ventilation and air conditioning (HVAC) system, a processing module in communication with a non-volatile memory having thereon a processor-readable media and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, an air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects comprised of a plurality of sub-goals, with a dynamic threshold value, the dynamic threshold value linked to the first, second, and third ventilation-associated parameters as well as to the heating and air-conditioning associated parameter related to the internal and external temperature of the multi-storied structure; the method comprising: selecting a historical dataset comprising a first set of forecast pollutants' values received from one or more predictive forecast statistical models and a first set of actual pollutants' values received from one or more measurements of the pollutants; generating one or more variants of machine learning models to model performance of the one or more predictive forecast models by training the one or more variants of the machine learning models on the historical dataset; receiving a current dataset comprising a second set of forecast pollutants' values derived from the one or more predictive forecast models and a second set of actual pollutants' values derived from the one or more measurements of the pollutants; correlating the current dataset with the historical dataset to adaptively obtain a filtered historical dataset; selecting the one or more variants of the machine learning models trained on the historical dataset and evaluating them on the filtered historical dataset to assign weights to each of the one or more variants of the machine learning models and their outputs; and deriving a statistical model in the form of an optimal combination function to determine at least one combined forecast pollutants' value by combining weights assigned to each of the one or more variants of the machine learning models trained based on the evaluating of the one or more variants of the machine learning models on the filtered historical dataset and the outputs of the each of the one or more variants of machine learning models trained on the historical dataset, wherein the selecting, the generating, the receiving, the correlating, the evaluating and the deriving are performed by the processor using computer-readable instructions stored in the memory.

These and other features of the libraries, systems, methods and computer readable media for minimizing pollution inside an enclosed structure in an optimal manner, utilizing dynamic, user-defined threshold values, will become apparent from the following detailed description when read in conjunction with the figures and examples, which are exemplary, not limiting.

BRIEF DESCRIPTION OF THE FIGURES

For a better understanding of the libraries, systems, methods and computer readable media for minimizing pollution inside an enclosed structure in an optimal manner, utilizing dynamic, user-defined threshold values, reference is made to the accompanying examples and figures, in which.

DETAILED DESCRIPTION

Figure 1:
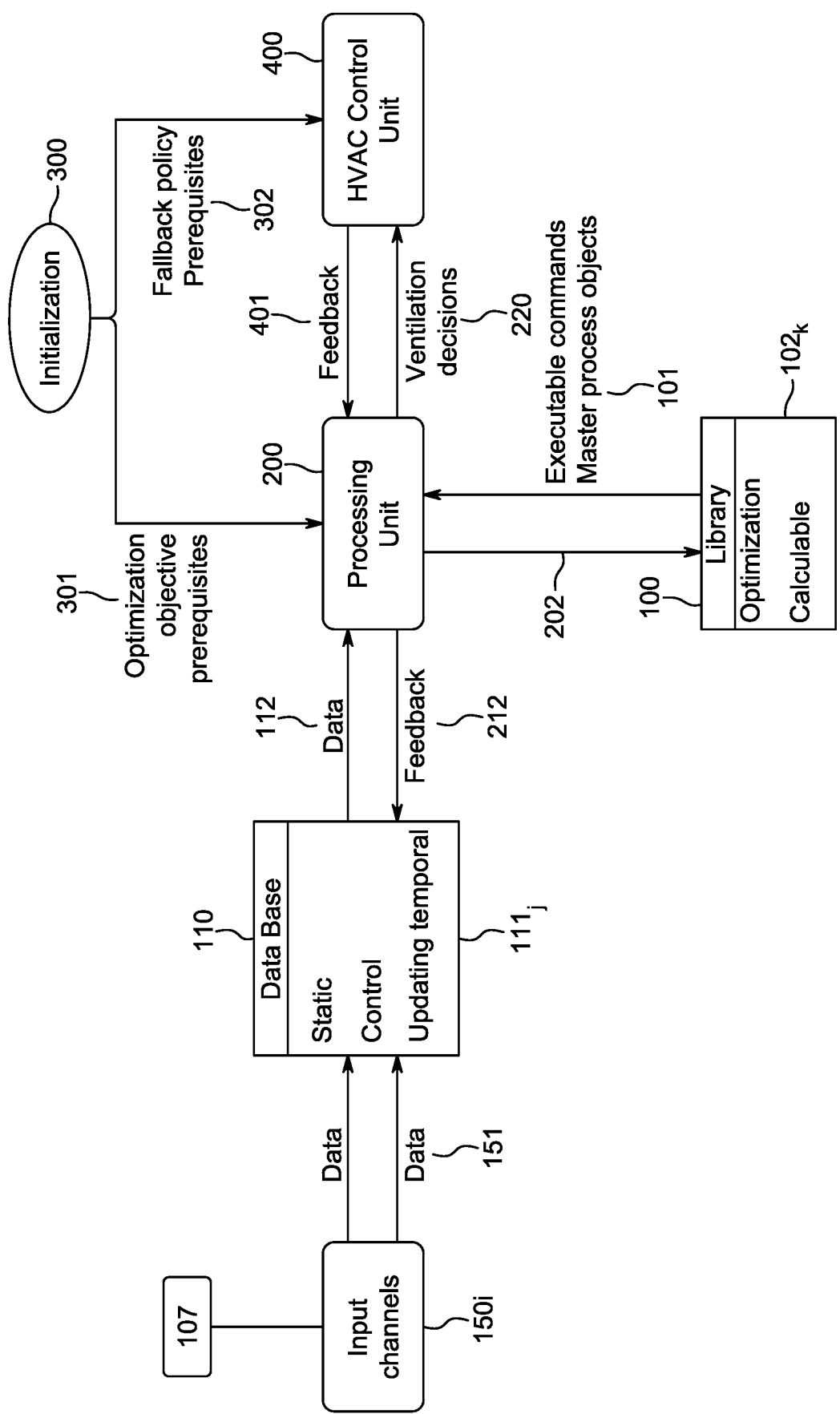
FIG. 1, Illustrates a generalized information flow between the units of the system.

Provided herein are embodiments of libraries, systems, methods and computer readable media for minimizing pollution inside an enclosed structure in an optimal manner, combined with minimizing energy requirement by the HVAC system, maintaining outdoor air supply and additional requirements, utilizing dynamic and adaptive, user-defined ventilation criteria. More particularly, provided herein are embodiments of methods of providing instructions to an integral HVAC system in a multi-storied, enclosed structure for ventilating the structure in a manner that will maintain preselected parameters, whether user defined or regulation based.

Definitions

Optimization objective: The definition of the optimal outcome that the system is expected to pursue. Defined by the user and per embodiment in a given instant it is unique. May be comprised of several goals and a prioritization logic which combines them into one objective. The optimization objective can be configured to weigh various parameters, for example: energy, heat, $CO_2$ levels, regulation and enclosed structure standards, air quality, and air pollution.

Optimization strategy: A method employed by the system in order to pursue the optimization objective. An instance of the system may include more than a single optimization strategy, in which case it will also have the ability to select what strategy is most suitable to be used in a given instant.

Prerequisites: A collection of conditions that the system must make sure are being met at all time, with superior priority. They are typically defined to make sure that the structure is safe and comfortable for the inhabitants, before striving to improve any other aspect of the HVAC operation.

Linked data bases: The collection of data utilized by the optimization strategy in order to interpret the optimization objective and pursue it. The linked databases contain both continuously-updated parameters (e.g. the temporal concentration of contaminants in indoor/outdoor air) as well as static parameters (e.g. physical measures of the structure) and definitions (e.g. the required average outdoor airflow per occupant).

Available outdoor air: The outdoor air which at a given instant can be supplied by the HVAC system into the enclosed structure. Includes any parcel of air outside the enclosed structure whose composition has measurable causal effect on the composition of the indoor air, in case of ventilation.

The system is configured to attempt reaching optimal outcomes and to provide that the prerequisite demands are met at all time. In different embodiments, the system provided may be initialized with different optimization objectives and different prerequisites, according to the specific needs of the system or the user, or according to the specific preferences of the user. In operating, the system utilizes linked data bases, which may contain data, definitions, and any other kind of information that may be provided in order to assist the system to successfully interpret the prerequisites, to comply with them and to lead a course of operation which achieves an optimal result with respect to the optimization objective.

It is noted, that while various systems are known to compare external pollution levels to measured internal levels, or to a fixed threshold, the system provided herein employ ventilation criteria which are dynamic and adaptive, and which are continuously updated in real time in relation to different available parameters, in a manner which reflects the current (or immediately determined) state of the enclosed structure as well as the preferences of the user, at the current instant and possibly also during a forecasted future.

Accordingly, it is possible that in a given day (or time) a certain external air pollution level will lead to opening the system for fresh air ventilation, while in another day (or time), the same pollution level would lead to shutting off of the outdoor fresh air ventilation. Furthermore, it is possible that in a given day (or time), a certain combination of measured external and internal air pollution levels will lead to opening the system for fresh air ventilation, while in another day (or time), the same combination will lead to shutting the fresh air ventilation. Thus, on a continuous basis, the system establishes new criteria that will define the opening/closing or increasing/decreasing fresh air ventilation into the enclosed structure.

The system can be configured to control the flow of outdoor air supply into the multi-storied enclosed structure. This control can be implemented for example, by controlling a relay (referring to an electrically controlled device having at least two states which correspond to the open circuiting and the conducting states of a conduction path in an electric circuit), in order to switch an outdoor air supply fan on or off. Another option, can be for example, an outdoor air supply fan, which can be driven by a variable speed drive (VSD), controlled by the system disclosed herein in order to modulate the outdoor air flow. Furthermore, the system can be configured to control at least one outside air dumper (referring to plates or slats disposed in an air shaft and the like with variable opening configuration), in order to modulate the outdoor air flow or the ratio between the flows of outdoor air and indoor recirculating air supplied to the enclosed structure. As used herein, the dampers can be any computer controlled machinery which may modulate or regulate the effective cross section of a ventilation duct, chimney, VAV box, air handler, or other air-handling equipment resulting in modification, modulation or regulation of the total air flow though that ductchimney, VAV box, air handler, or other air-handling equipment.

More particularly, in embodiments incorporating ventilation criteria relying on comparison of external pollution levels to pollution level thresholds, these are not fixed thresholds, but rather dynamic and adaptive ones, continuously adjusted by the optimization strategy in real time, according to the ever-changing conditions inside the structure and outside of it during the current instant and possible also during a forecasted future.

Various systems are known to measure external pollution levels and to compare it to either measured internal levels or to fixed thresholds. These systems may yield ventilation criterion based on simply whether the external pollution level is higher or lower than the measured internal pollution level or than the fixed threshold to which it is being compared. In contrast, the system provided therein may be configured to take into account various other considerations:

Throughput (flux) requirements and maintenance of indoor air quality, according to accepted standards of ventilation and the user's preferences, as defined by the prerequisites.

A dynamically-weighted combination of different sub-goals that the system is expected to pursue, as defined by the optimization objective. These may be various indicators of indoor air quality and air pollution, heat maintenance and/or energy preservation.

The dynamic optimization strategy may take into consideration various parameters which allow it to achieve better outcomes with respect to the optimization objective. For example: the cumulative ventilation effect during previous ventilation events; the lag time between previous ventilation events and the current instant; the difference between the current outside pollutants' levels and internal pollutants' levels relative to historic values of that difference; ventilation throughput and ventilation volume relative to the structure's volume; the measured or estimated indoor air pollution; occupancy of the structure; $CO_2$ levels inside the structure; various models allowing estimation of indoor air quality and indoor air pollution, as a function of the ventilation state and other measured conditions inside and outside the structure; various models allowing prediction of outdoor air pollution.

In certain embodiments, the system will estimate current pollution levels in the enclosed structure. The estimation can be based on pollution monitoring devices associated with the structure (referring in certain exemplary implementation to the concentration of one or more predetermined gases or other air-borne materials, e.g. $NO_2$, in the indoor air). It can also be based on a calculation which considers pollution of the available outdoor air during previous ventilation events, the lag time since previous ventilation event, the cumulative impact of previous ventilation events persisting to the current instant, and characteristics of the ventilation system and of the structure. In addition, the system can also use a dynamic air pollution modeling, which takes into consideration the measured/estimated difference between the internal and external pollution levels as well as the disintegration and decomposition kinetics of indoor pollutants, factors affecting the disintegration (e.g., temperature, relative humidity, recirculating indoor air flow etc.), half-life time of various pollutants, reactions of various pollutants, statistical characteristics of pollution dynamics in the structure, and the like parameters that affect indoor pollutant levels that are connected with the pollutants themselves.

The impact rate, in other words, the rate at which the ventilation of external fresh air will affect the internal pollutant levels, will depend, not only on the throughput (flux) of outdoor air, but also on characteristics of the ventilation system, as well as on the difference between outside pollutants' levels and internal pollutants' levels. That difference will also affect the impact rate due to passive exchange of air with the structure's exterior (i.e. by means other than active ventilation flow through the inlets of the ventilation system, such as diffusion), whether during ventilation or when ventilation stops. It stands to reason, that the larger the difference between outside pollutants' levels and internal pollutants' levels, the faster will the impact rate be.

In certain embodiments, forecasting of future pollution levels and trends will be implemented in the systems and libraries disclosed. At each point in time, the system will perform forecasting of future internal and external pollution levels, whether it will increase or decrease and to what level. Based on the forecasting, the system can be configured to alter the decision of whether at that point in time, ventilation should be initiated or increased, or whether to shut/decrease the ventilation system.

In certain exemplary implementation, the system may implement modeling of energy requirement as a function of various indoor and outdoor variables and various parameters of the HVAC system. These may include measured or forecasted outdoor temperature and relative humidity, solar radiation, indoor occupancy, indoor heat sources, thermal capacity and thermal, mechanical and electric efficiency of the different components of the HVAC system, etc. The modeling may employ thermodynamic, psychrometric, electrical, physical and other calculations in order to accurately estimate the instantaneous energy requirement by the HVAC system under any given combination of indoor and outdoor variables. In certain exemplary implementation, this modeling may facilitate input from measurement of the actual energy requirement (at the entire structure, of the HVAC system as a whole or of discrete components of it) at each instant and may further use machine learning modules.

In certain exemplary implementation, the systems provided herein may further comprise a user interface which may contain commands for controlling various aspects of the functionality of the system and/or monitoring data and plots about the state of the HVAC system and the multi-storied structure. These include, for example, dynamic control of some parameters of it, through a graphical user interface (GUI), accessed over the internet from any network access terminal. For example, incorporating strategy such as those disclosed herein, the weighting parameter A quantifies the desired prioritization of minimizing contaminant concentration and minimizing energy consumption. In cases where the user wishes to have a dynamic control on a tuning parameter such as A, a user interface will be provided. Such user interface may be virtual (e.g. web portal interface or application) or within a control panel as a part of the processing module and/or the HVAC control module.

Additional types of dynamic control that may be given to the user via such user interface can be, for example: any other tuning parameter incorporated by an active optimization strategy; definition of the optimization objective, such as adjustment of the hierarchy between the different sub-goals, switching on and off of different sub-goals from a predefined list of possible sub-goals; selection of relevant prerequisites from a predefined list of possible prerequisites; input concerning expected occupancy in the multi-storied structure (e.g. the user may inform the system that an exceptionally high or low occupancy is expected in the structure in certain future time, allowing the system to make a better optimization), and/or their combination.

The systems provided may also comprise a display and the GUI may also include graphical representation of various kinds of data, for example: the overall operational state of the system; the recent activity logbook of the system, e.g. a plot of the recent HVAC systems' states; measured or calculated recent data about indoor and outdoor concentrations of contaminants, supply of outdoor air to the structure and other kinds of data of interest; aggregative statistics and plots summarizing the system's performance (e.g. with respect to each of the defined goals), or a combination thereof.

Accordingly and in certain exemplary implementation, provided herein is a processor-accessible library comprising control information for a multi-storied structure's heating, ventilation and air conditioning (HVAC) process, wherein said library implements a method identifying optimized period for ventilation and/or heating and air conditioning. It is noted, that the libraries, methods and systems provided herein can be configured to pursue the predefined optimization objective in any enclosed volume within the multi-storied structure. For example, rooms, offices, apartments, open floor plans and the like or their combination and not necessarily to the whole multi-storied structure.

The ventilation parameters used in the libraries, systems, methods and computer readable media for minimizing pollution inside an enclosed structure in an optimal manner, utilizing dynamic and adaptive, user defined (i.e., selectable) ventilation criteria provided herein, can comprise: a first ventilation-associated parameter ($VAP_1$), related to the inside of the multi-storied structure; a second ventilation-associated parameter ($VAP_2$), related to the outside of the multi-storied structure; and a third ventilation-associated parameter ($VAP_3$), related to temporal ventilation history, wherein the library further comprises a plurality of master process objects linked to the first, second, and third ventilation-associated parameters.

Likewise, the library can further comprise a fourth ventilation-associated parameter ($VAP_4$), related to a hub encompassing the enclosure; and a fifth ventilation-associated parameter ($VAP_5$), designating the location of the enclosure within the hub, wherein the library further comprises a plurality of master process objects linked to the fourth, and fifth ventilation-associated parameters; and also, sixth heating and air-conditioning associated parameter ($HACAP_6$), related to an internal temperature of the enclosure; and a seventh heating and air-conditioning associated parameter ($HACAP_7$), related to an external temperature of the enclosure, wherein the library further comprises a plurality of master process objects linked to the sixth, and seventh ventilation-associated parameters. Furthermore, the library is configured such that the information used to control the system is selectably modifiable by a user. Furthermore, the library can comprise an eighth heating and air-conditioning associated parameter ($HACAP_8$), the eighth heating and air-conditioning associated parameter ($HACAP_8$) comprising dew point used in calculation of energy requirement by the fresh air system and in circumstances where the venting power is configured to be tuned among multiple values. In these cases, the system is configured to determine the highest airflow without injecting liquid water into the multi-storied enclosed structure instead of cooled humid air.

In certain exemplary implementation, the system can be initialized with a user-defined (in other words, selectable) prerequisites, in the form of a set of rules which the system must make sure to meet at all time.

Examples of possible prerequisites:
Maintain compatibility with regulation or standard of ventilation, for example the ASHRAE 62 standard.
Maintain the CO2 concentration inside the enclosed structure bellow some predefined threshold.
Supply to the enclosed structure at least volume V of outdoor fresh air in each time window of duration T, where V and T are predefined values.
Never stop the outdoor air ventilation to the enclosed structure for duration longer than some predefined value.
Maintain certain relation between the indoor and the outdoor air pressures and between the air pressure in different sub zones of the indoor environment.

In certain exemplary implementation, the system can be initialized with a user-defined (in other words, selectable) optimization objective, comprised of a set of sub-goals and a prioritization logic. The prioritization logic defines the way the sub-goals are combined together, for example in any case where optimizing with respect to one sub-goal may result in sub-optimized outcome with respect to another.

Examples of possible sub-goals can be:
- Reduction of indoor concentration of one or more contaminants of outdoor source (e.g. NO, NOx, Benzene, PM2.5 etc.) during occupancy times.
- Minimizing at least one indicator of corruption and contamination of the indoor air as a result of indoor sources or indoor processes (such as accumulation of $CO_2$, diminishing of $O_2$, accumulation of contaminants such as volatile organic compounds, appearance of offensive odors etc.) during occupancy times.
- Reduction of energy requirements of the heating, ventilation, air-conditioning and refrigeration processes.
- Minimization of times where some criterion demanding minimal outdoor air supply is violated.
- Any demand which can be given as a prerequisite can alternatively be given in a less prescriptive manner as a sub-goal in the optimization objective. In such case, complying with it will be considered with the rest of the defined sub-goals.

Accordingly and in certain exemplary implementation, the first ventilation-associated parameter ($VAP_1$), of the library can comprise selectibly determined, predicted and/or forecasted pollutants' concentration within the multi-storied structure; the second ventilation-associated parameter ($VAP_2$) of the library, can comprise selectably determined, predicted and/or forecasted pollutants' concentration in the air immediately outside the multi-storied structure (the available outdoor air, as defined herein). In another embodiment, the first ventilation associated parameter (VAP1) is a data set containing at least one of temporal and spatial quantification of the pollution level of the air inside the enclosed structure. Similarly, the second ventilation associated parameter (VAP2) can be comprised of a data set containing at least one of the temporal and spatial states of outdoor pollution into the enclosed structure. Further, the third ventilation associated parameter (VAP3) can be comprised of a data set containing at least one of temporal and spatial quantification of the vent states of the enclosed structure.

Along with the set of goals, the optimization objective may comprise a prioritization logic by which they are combined together, for example:
- Strict Hierarchy: Optimization is first made with respect to a first sub-goal and only then, to the extent that this is possible without compromising the outcome with respect to that first sub-goal, further optimization is done with respect to the sub-goal next in priority, and so forth.
- Separation in time: Optimization is done with respect to only a single sub-goal in a given time, the selection of that single sub-goal changing between different times, according to some condition (which can be for example the assumed or measured occupancy of the multi-storied enclosed structure).
- Weighted combination: A weight is assigned to each of the sub-goals and optimization with respect to that sub-goal is prioritized according to that weight.
- Health impact in humans: When combining a sub-goal which is derived from an attempt to minimize exposure to health hazards, the combination can be done by using toxicity function. For example, minimization of concentration of some contaminant in the indoor air will get lower weight the less toxic the concentration of it is.
- Prioritization logic combining more than one of the above is also possible, for example as a rule-based algorithm. For example, a weighted combination where the weights are tuned dynamically in time according to the occupancy of the multi-storied enclosed structure and also according to the toxicity of the contaminants of interest.

The libraries used in the systems, can be dynamically linked to remote databases, and further comprise: parameters associated with physical properties of the multi-storied structure; physical properties of the enclosed structure and of the HVAC system; topographical and/or geographical characteristics of the immediate surroundings of the multi-storied structure; temporal data about occupancy in the multi-storied structure; temporospatial meteorological data.

Temporospatial (in other words time and location related) data about concentration of contaminants in an indoor or outdoor air, which may be referenced at some location inside the discrete structure, at the vicinity of it or at locations further away; temporospatial data about the state of the HVAC system; various quantities which may serve as indicators for the current or the future levels of contaminants of interest in the vicinity of the multi-storied enclosed structure; transformed (e.g., log, ln, 1/x, e^x, etc.) data of data items; dimensionless representations of data items; or a combination of parameters comprising the foregoing.

The physical structure data can be, for example, ceiling height and floor area; division to floors and separated spaces; specification of volumes in which the air is not circulated directly and efficiently by the ventilation system (e.g. rooms without openings of the ventilation system, volumes above ceilings and below floors etc.); specification of interfaces and openings (e.g. openable windows and doors) allowing exchange of gases with the surrounding of the discrete structure not through the ventilation system; the use of the discrete structure (e.g. an office, a gym, a factory, a private residence etc), or a combination of the foregoing.

Likewise, the physical properties of the HVAC system can be, for example: The different states of operation of it which are accessible to the system; the heating and cooling capacity of the system under any given combination of conditions; mechanical characteristics such as electrical power of engines, coefficient of performance (COP) or energy efficiency ratio (EER) of heating and cooling equipment and components (such as chillers, heat pumps, fan coilsetc.) etc.; parameters allowing calculation of the energy consumption by it, as a function of combination of conditions (which may be, for example: the outdoor temperature, the outdoor relative humidity, the target indoor temperature, the flows of outdoor air, the flow of indoor air circulation, indoor occupancy, independent indoor heat sources etc., or a combination thereof); or a combination thereof.

Likewise, the topographical and geographical information about the surroundings of the discrete structure can be, for example: coordinates of the discrete structure (longitude, latitude, altitude); a 3D model of the area or an estimated 3D model of the area based on a 2D map; or a combination thereof. In addition, the temporospatial meteorological data can comprise, for example, logbooks of meteorological parameters, or logbooks of descriptive statistics values (e.g. periodical averages) of meteorological parameters, for example in the vicinity of the structure. Examples of the meteorological parameters are: temperature, relative humidity, wind speed and direction, precipitations, sky cover, clouds, atmospheric pressure, flux of solar radiation etc.

Also, the concentration data about contaminants in the indoor or outdoor air may include, for example: a logbook of concentration values, measured or calculated; logbooks of quantities which are calculated based on concentration levels of one or more contaminants (e.g. weighted average of the concentration of several contaminants, combined toxicity index of several contaminants etc.); logbooks of descriptive statistics values, providing a compact representation of logs of instantaneous levels of contaminants.

In certain exemplary implementation where the system incorporates an input channel providing outdoor measurement of NOx once every ten seconds, and where it has been found that: the amplitude of the high-frequency fluctuations of the concentration during the ten minutes prior to the current instant can be used to predict the trend of the concentration in a later instant (e.g. whether it is expected to increase or decrease); and additionally, the low frequency trend, quantified by averages of 15 minutes, during the past week, can be used to predict the expected values of concentration over the next few hours. For that embodiment in that specific structure, the logbook will only hold high frequency data for 15 minutes. The rest of the logbook will contain only average value for every 15 minutes. A periodic internal process will compute the averages and erase old high frequency data.

Data about the state of the HVAC system can be, for example: logbook of the states of the HVAC system (comprised e.g. of the flows of outdoor air supply and indoor air circulation, target indoor temperature etc.); logbook of the power consumption by the HVAC system, measured or calculated; or a combination thereof. In addition, data about the occupancy of the structure can be, for example: definition of the expected occupancy of the multi-storied enclosed structure at any given time; and/or logbook of the measured or estimated actual occupancy of the multi-storied enclosed structure.

Furthermore, the logbooks of various quantities which may serve as indicators for the current or the future levels of contaminants of interest at the vicinity of the multi-storied enclosed structure, can be, for example: data about pollution sources, such as: information about traffic patterns and density; information about the activity of other sources of air pollution such as factories, power plants, commercial perimeters etc.; or a combination thereof.

Dimensionless representation of data items, can be, for example, quantities obtained by division of a physical value by some weighting scale having the same dimensions. For example, operation such as $$f(x) = \frac{x - \min(L, x)}{\max(H, x)}$$

where L and H are some characteristic high and low threshold values, respectively, and the representation is a number between 0 (obtained where x≤L) and 1 (obtained when x≥H). Likewise, non-linear representations can be used, for example:

$$f(x) = 1 + \frac{1}{2}\tanh\left(\frac{x-b}{a}\right)$$

in which case f varies smoothly between 0 and 1, with its curvature and center (i.e. the value of x for which f(x)=½) defined by a and b, respectively. Such dimensionless representations can be used, for example, in calculating a quantified combination of two different types of data.

The libraries and databases provided herein may further comprise: parameters related to the toxicity of each contaminant of interest at different concentrations and for exposures of different durations (for example, lethal dose 50%, concentration of no observed adverse effect, etc.) and possibly the combined effect and toxicity of multiple contaminants; parameters related to one or more models describing the indoor and outdoor dynamics of gases and other air-borne materials in the enclosed structure (for example diffusion coefficients, rates of various chemical and physical processes, coefficients of statistical regression model predicting indoor concentration of contaminant from known outdoor concentrations of that contaminant, etc.); and parameters required for the assurance of compatibility with the prerequisites (for example, for complying with the ASHRAE 62 standard, the library may include the definition of occupancy category for spaces in the enclosed structure, according to the standard, and the mandatory ventilation requirements defined by the standard for each category). These parameters may or may not be saved in the linked databases.

In certain exemplary implementation, the library may further include implementation of calculations used to assure compatibility with the prerequisites. For example, in certain operable example, where the outdoor airflow may be switched by the system between 0 and R (volume/time) and the prerequisites include the demand that the cumulative outdoor fresh air vented into the enclosed structure in any time period of duration T, will be at least of volume V, where T and V are some predefined values, the following calculation may be implemented in the library, determining until what time the system is allowed to keep the ventilation continuously stopped, starting from the current instant t, where the time is discretized with step dt:

```
tV = t+T
ti = t
while ti>t−T
    Vi = the total outdoor air supplied to the structure between times ti
    and t
    if Vi < V and ti+T−(V−Vi)*R <tV
        tV = ti+T−(V−Vi)*R
    end
    ti = ti − dt
end
```

In some embodiments, the library will comprise implementation of one or more optimization strategies which are based on a dynamic threshold value (DTV). In these strategies, the system compares between a dynamic threshold value and the current value of VAP2, and sets the ventilation decision according to the results of the comparison. For example, in embodiments where the decision space is binary (i.e. where the outdoor airflow can only be turned on or off), the resulting ventilation decision will be to turn the ventilation on in case that the value of VAP2 is smaller than or equals to the dynamic threshold value. Otherwise, the decision will be to stop the ventilation. This, providing that the directive of choice is not expected to cause violation of any of the prerequisites. A flowchart illustrating these strategies is presented in FIG. 3.

In another embodiment where the decision space is non-binary (i.e. where the outdoor $$f(x)=\min(M,\max(0,\alpha \cdot x))$$

airflow can be switched between multiple values), an additional calculation may be implemented and used in the case that the current value of VAP2 is found to be smaller than or equals to the dynamical threshold value. This calculation determines the ventilation outdoor airflow associated with the difference between the current value of VAP2 and the dynamic threshold value. For example, in certain exemplary implementation where the ventilation outdoor airflow can be tuned continuously between zero and some maximum value M, this calculation may be where a is some predefined coefficient, x is the difference between the current value of VAP2 and the dynamic threshold value and the result f is the required ventilation outdoor airflow.

Additionally and in certain exemplary implementation, the dynamic threshold value (DTV) is computed based on various considerations related to the defined optimization objective and possibly also to the defined prerequisites. These may be, for example: the current indoor pollution level; a weighted combination of outdoor pollution levels during previous ventilation events; the outdoor airflow during previous ventilation events, relative to the volume of the enclosed structure; a forecast of outdoor pollution levels; historic trends of outdoor pollution levels; an estimate of the instantaneous energy requirement by the HVAC system which is expected to result from any ventilation decision actuated by the system; the current and expected occupancy and occupancy trends in the enclosed structure; how close are the conditions in the enclosed structure to violating the prerequisites; any other available data related to or associated with the optimization objective or the prerequisites; or combination thereof.

It is noted that while the same optimization strategy can be illustrated in more than one equivalent way, every possible optimization strategy which satisfies the following condition can be considered as equivalent to the provided dynamic threshold value optimization strategy: Let d be the ventilation power decided by the system in a given situation. Where d is a function of some quantity, c, related to the composition of the outdoor air, and possibly of additional parameters as well. There exists at least one such quantity c such that d is monotonically increasing with respect to it. I.e., for every two values c1, c2 where c1 is larger than or equals to c2, the result d(c1, . . . ) is larger than or equals to d(c2, . . . ), providing that all other parameters affecting d are kept fixed.

Example I: A Dynamic Threshold Value Strategy

Given circumstances where the optimization objective requires simultaneously minimizing indoor air pollution (indicated in that embodiment by NOx concentration) and minimizing energy requirement by the HVAC system; where the prerequisites demand that in every time window T within occupancy times, the HVAC system will supply total fresh air in volume of at least V1 cubic meters per square meter of floor area of the enclosed structure per second, and also at least V2 cubic meters per occupant in the enclosed structure per second; where occupancy of the structure is defined to be P during defined occupancy times and zero otherwise; where an air pollution monitoring station provides continuous real time data about concentration of NOx in the available outdoor air, as well as the real-time temperature outside the structure; where the indoor temperature is assumed to be fixed during all occupancy times; where the system is capable of switching the outdoor airflow on or off, with the outdoor airflow being F when ventilation is on; where the library comprises an executable model which yields estimation of the energy requirement by the HVAC system as a function of the temperature outside the structure; and where the library further comprises the calculation yielding, per given relevant history of ventilation up to the current instant, the longest period of time it is allowed to continuously stop outdoor air ventilation to the building, starting from the current instant, without violating the prerequisites. In such an example of technical circumstances, the optimization strategy may be, for example, a dynamic threshold value strategy, where VAP2 comprise the measured outdoor NOx concentration and the dynamic threshold value is calculated as follows. A first value $v_1$ is calculated as a weighted combination of the measured previous values of VAP2, if the current instant is within the defined occupancy times of the structure. If the current instant is not within the defined occupancy times of the structure, $v_1$ is set to zero. A second value v2 is calculated as the expected energy requirement by the HVAC system in case of ventilation at the current instant. A third value v3 is calculated as the longest period of time it is allowed to continuously stop the ventilation, starting from the current instant. The dynamic threshold value is then calculated as $DTV=v_1+(B_2 \times v_2)+(B_3 \times v_3)-B_0$, where $B_2$, $B_3$, $B_0$ are predefined coefficients. The current value of VAP2 and the dynamic threshold value are then re-evaluated periodically, and compared. The fresh air ventilation to the building is then set to be on whenever the current value of VAP2 is found to be lower than or equals to the dynamic threshold value, and otherwise set to be off whenever the current value of VAP2 is found to be higher than the dynamic threshold value.

Example II: Statistical Predictive Strategy

A statistical predictive strategy, using one of the predictive models described herein to calculate and associate an expected future of conditions in the enclosed structure (comprised e.g. indoor levels of the contaminants of interest and energy consumption) with every considered future course of action. Actuating the course of action for which the overall expected future is optimal according to the optimization objective.

Example III: META-Strategy

A meta-strategy, designed to examine different possible strategies and choose to operate according to a subset of them found to be the most suitable, at each given instance. Examples: Simulate operation according to the different strategies over the past data. Assess the outcomes obtained according to each and currently choose to operate according to the best performing strategy; and/or a meta-strategy which prioritize the strategies. The top-priority strategy is used unless some resource (e.g. library element, hardware device, etc.) required by it is unavailable, in which case the meta-strategy turns to the next in priority strategy and so on.

Further included in the library can be a collection of predictive models, yielding expectations for future behavior of data. The prediction for a given data may be based on past values of the same data and/or on past values of other available data (e.g. levels of the contaminants, occupancy, activity of pollution sources, meteorological measures etc.), and/or on reduced statistical representation of available historic data.

For example: statistical predictor for the expected value or other statistic (e.g. the standard deviation) of the concentration of a given contaminant in a specific location, at a defined future instant or over a defined future interval of time, such as calculating the mean (or, alternatively, the median) historic change of the concentration for the current instant over some defined cross section (e.g. same time of the day, same day of the week and same season of the year). Use this mean (or median) as the expectation for the concentration change at the current moment. Other examples are machine learning model using a deep neural network in order to make one of the above predictions; and/or prediction model incorporating physical or chemical models, such as those described herein, predicting the future trend of the concentration levels of one or more contaminants based on their past and current levels, past, current and planned states of the HVAC system and other inputs required by those models.

The library may contain elements which are stored in a memory at the local computer, alongside elements which are stored remotely. The physical distribution of the library is abstracted from other component of the system by the option to mark each element of the library as unavailable. Thus, in case that a device hosting one or more elements of the library becomes unavailable (e.g. due to network failure or malfunction of the device itself), all the elements hosted by this device (and, possibly, also other elements which have mandatory dependency on them) will be marked as unavailable by the processing unit. The processing module will then refrain from attempting to access unavailable elements, until they become available again.

The directives made by the optimization strategy, processed over a processing unit, can be initiated and actuated by a control unit in electric communication with the HVAC system and to which the processing unit have a local or remote communication channel.

As indicated, the libraries provided herein are used to implement the methods provided herein, which are implementable using the systems disclosed. Accordingly and in an exemplary implementation, provided herein is a computerized method for optimizing heating, ventilation and air conditioning (HVAC) process in a multi-storied structure implementable in a system comprising the multi-storied structure, a heating, ventilation and air conditioning (HVAC) system, a processing module in communication with a non-volatile memory having thereon a processor-readable media and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects, linked to the first, second, and third ventilation-associated parameters as well as to the heating and air-conditioning associated parameters related to the internal and external temperature of the multi-storied structure; the method comprising: responsive to a ventilation prompt, selecting a set of operations configured to achieve a predetermined optimization objective; associating the selected set of operations to create a set of process commands within the ventilation request and forming a ventilation command, wherein the set of master process objects in the library are linked to the ventilation command without copying the master process objects into the ventilation command; and executing the ventilation command.

The method provided, to control the state of an HVAC system in order to actuate a defined optimization strategy, can be configured to pursue a defined optimization objective (and its associated sub-goals), while subject to defined prerequisites, utilizing the contents of linked databases featuring various parameters, among which; one or more is continuously updated through an input channel that is a part of a plurality of input channels (see e.g., FIG. 1).

The operation of any optimization strategy relies in certain exemplary implementations on utilizing data which can be stored as a part of the linked data bases. Some items of the data bases may be updated through input channels, while others may be constant, initialized only once as the system is initially deployed, or updated only manually by the provider.

Possible data stored in the data bases can be, for example:
Parameters related to the operation of the HVAC system, such as those defining indoor recirculating and outdoor airflows, heating and cooling rates, etc. at different subspaces of the multi-storied enclosed structure and under various conditions.
Parameters allowing estimation of the energy requirement by the HVAC system under various conditions, such as mechanical, electric and thermal parameters of the various components of the HVAC system.
Ceiling height and/or area at the structure, division of it to floors and other subspaces.
The typical activity which takes place in the multi-storied enclosed structure and in each of the subspaces (office, storage, gym, kitchen, etc.).
Specification of interfaces and openings allowing passive exchange of air and other gases with the surrounding of the multi-storied enclosed structure.
Structural data related to the efficiency of ventilation in subspaces of the multi-storied enclosed structure. In particular, specification of volumes in which the air is not circulated directly and efficiently by the ventilation system (e.g. rooms which are not directly fed by the ventilation system, volumes above ceilings and below floors, major office cabinets etc.).
Topographical and geographical information about the multi-storied enclosed structure and the surroundings of it. May include the coordinates of the multi-storied enclosed structure and a 2D or 3D model of the surroundings.
Parameters related to health hazards of airborne materials per concentration and other conditions (e.g. saturation levels of the toxicity, joint effects of groups of materials etc.)
Parameters related to processes which may take place in the multi-storied enclosed structure and affect the concentration of materials of interest:
  Parameters related to chemical and physical processes such as flow, diffusion, dispersion, decomposition, molecular interactions and reactions, etc. Possibly involving more than a single species of molecules and possibly affected by temperature, humidity and other meteorological data.
  Parameters related to the effect of the HVAC system in each of its possible states on such processes. For example, of the thermal processing (heating/cooling), of indoor recirculating airflow and of ventilation airflow.
  Parameters related to the effect of the activity in the multi-storied enclosed structure on the concentration of materials of interest.
Temporal data about concentration of materials (gases or other airborne materials) in an indoor or outdoor air, which may be referenced at locations inside the multi-storied enclosed structure, at the vicinity of it or at locations further away. These may include:
  Temporal concentration of material of interest, measured or estimated.
  Descriptive statistics or other reduced mathematical representation of temporal concentration data.

An index calculated based on concentration of one or more materials and on other data and parameters defined in the library.

Temporal data about the activity of the HVAC system, such as the states of it and the energy required by it.

Assumed, estimated or measured temporal data about the occupancy of the multi-storied enclosed structure and about human or other activities which occur in it. May include data about holidays and weekends and the expected occupancy during them.

Temporal meteorological data such as temperature, relative humidity, wind speed and direction, precipitations, sky cover, clouds, atmospheric pressure, ux of solar radiation etc.

Temporal data about various other quantities which may be in use by the optimization strategy. For example, this may include quantities which may serve as indicators for the concentration of a material of interest, such as traffic, industrial activity, etc.

It is noted, that the system for implementing the methods provided herein, can be initialized with a set of demands that must be met by the system at all times (in other words, prerequisites). For example, in cases of malfunction, these demands are required to be met in any case that the system is running and has control over the HVAC system. These determine the boundaries of the decision space inside which the system operates. For example, in cases of malfunction, these demands are required to be met in any case that the system is running and has control over the HVAC system. Different embodiments of the system may be initialized with different sets of prerequisites. These prerequisites can be, for example, definition of minimal mandatory outdoor air supply, and/or definition of the allowed states of the HVAC system, and/or definition of the fallback policy to be exercised in case of partial system malfunction. The fallback policy contains simple instructions to be executed by the HVAC control unit, defined hereinafter, whenever it detects that the input stream from the processing unit has stopped (e.g. due to communication problem or due to malfunction in the processing unit itself). The HVAC control unit should be able to interpret these instructions as long as it is functional, regardless of the state of other components of the system and the communication with them. Therefore, the fallback policy does not require mandatory access to resources and data items which are stored or hosted elsewhere than on a local computer.

As indicated, the prerequisites can be defined according to the custom requirements of the user. In certain embodiments, some prerequisite can be related to a minimal mandatory supply of outdoor air to the multi-storied enclosed structure. The prerequisites of the outdoor air supply can be, for example, demand to maintain compatibility with a known standard of ventilation such as the ASHRAE 62 standard; definition that the average outdoor airflow within some custom period of time will be no less than some predetermined threshold; definition of a maximal allowed indoor concentration of CO2, either a constant threshold of indoor value or a threshold of the difference between indoor and outdoor concentrations of CO2; definition of a longest allowed period of time during which outdoor air supply for the multi-storied enclosed structure is continuously stopped; definition of a maximal percentage of time during which the outdoor air supply for the multi-storied enclosed structure is stopped; demand that the indoor temperature will be in a vicinity of a specified size from the chosen set temperature in any given time; or a combination thereof.

Similarly, the prerequisites may be related to definition of the allowed states of the HVAC system, which may comprise: possible values of outdoor air flow; possible values of indoor circulating flow; possible values of heating or cooling power, or their combination. Furthermore, values of heating or cooling power may take into account various considerations such as: the maximal possible air flow determined by the mechanical and thermal limitations of the machinery used by the HVAC system; this maximal flow typically depends on the outdoor temperature and dew point, the target indoor temperature set for the HVAC system and the mechanical and thermodynamic properties of the HVAC system. In embodiments where prerequisite that the indoor temperature will be in a vicinity of a specified size from the chosen set temperature in any given time is indeed defined, another prerequisite is required, concerning the maximal outdoor airflow which still allows the HVAC system to comply with the former. This limitation typically depends on the cooling or heating capabilities of the HVAC system, on the outdoor temperature and relative humidity, the target indoor temperature and the mechanical and thermodynamic properties of the HVAC system.

The term "system" shall also be taken to include any collection of systems or sub-systems that individually or jointly execute a set, or multiple sets, of instructions to perform one or more functions. Also, the term "system" refers to a logical assembly arrangement of multiple devices, and is not restricted to an arrangement wherein all of the component devices are in the same housing.

In certain exemplary implementation, the systems provided herein can comprise: a multi-storied structure with an HVAC system; a control module in communication with the HVAC system configured to control HVAC inside the multi-storied structure; a processing module in communication with the HVAC control module, the processing module comprising a processor, the processing module in communication with a plurality of input channels, each input channel in communication with a data source; a memory in communication with the processing module, the memory having stored thereon a library comprising a set of executable instructions configured, when executed, to cause the processing module to initiate and actuate instructions configured to maintain preselected parameters within the multi-storied enclosed structure, for example, minimizing air pollution within the multi-storied structure, while simultaneously minimizing energy requirement, in an optimal manner.

In certain exemplary implementation, the input channels are in continuous communication with the control module and/or the processor. The term "input channel" is from the view point of the controller and refers to the communication direction between various sources of data (for example sensors, prediction algorithms and the like) and the control module. The input channels can be, for example:

a. Feedback input from the HVAC system and/or sensors measuring its performance and/or state. This may be, for example, reports about measures of its actual state, such as the set and actual outdoor airflow, set and actual indoor temperature, its power consumption etc.;

b. Input from sensors monitoring levels of contaminants at specified locations, which may be either inside the multi-storied enclosed structure and/or at the vicinity of it and/or at remote locations;

c. Input from sensors monitoring different measures of the weather;

d. Input from systems used to estimate or measure the occupancy of the multi-storied enclosed structure, such as attendance systems, connected turnstiles, CCTVs, CO2 sensors and the like;
e. Manual or automated data load (e.g. download and upload or automated pull/push notifications) from public databases such as from that of the EPA, NOA, NASA and the like;
f. Inputs from the end user's interface of remote management of the device;
g. Inputs from a remote server including software updates and updates of data items;
h. Manual upload of any of the possible items of the library, or combination thereof.

Also, as used herein, the term "processor" is defined as including, but not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof.

In certain exemplary implementation, the processor is part of a central processing module, which can be integral to or separate from the control module. The processing module can be configured to, for example:
a. Operate according to one of the strategies or meta-strategies described hereinabove; and/or
b. Execute the logic determined by the strategy of choice, using the data available to the library. At each given instance, yield an instruction for a set state sent to the HVAC system according to the strategy. Validate that each instruction complies with the prerequisites defined; and/or
c. Contain self-control subunit which adjusts and updates the strategy used to the currently available and relevant data items and computation resources.

Examples of the need for such an adjustment can be: in case of hardware malfunction, which significantly reduces the computation power available for the processing module, the control sub-unit may choose to switch strategy from a heavy (e.g., multivariable optimization) strategy to a lighter one (e.g., less variables for optimization), assuring the continuous operation of the system even at the cost of compromising its performance; and/or upon failure which makes a certain data item unavailable or out of date, the system could make sure not to adhere to a strategy which is dependent on access to that data item; and/or in case of a communication failure which makes all the elements of the library which are remote from the local processing unit unavailable, the system could be configured, using the appropriate sub-unit, to switch to a local fallback strategy.

Thus, in certain exemplary implementation having a local minimal processing module and a major remote processing module (a master-slave mode), the remote module will direct its instructions to the local module. The latter in turn will accept the instructions from the former and forward them as they are to the HVAC control module, unless some malfunction is detected (e.g. an error message is accepted from the remote module, or no message is accepted from it, reaching a defined timeout). In such case, the local module will override the remote module and operate according to the best strategy accessible.

Additionally, or alternatively, a local and a remote processing module may operate in a shared mode, assigning each of them with the part of the computation load expected to match its computing resources. Thus, aggregative calculations over large data sets may be set to be performed by the remote module while smaller operations and the main workflow may be done by the local processing module In certain embodiments, the HVAC control module could be configured to:
a. Accept the instructions from the processing module and attempt to actuate them with the HVAC system.
b. The HVAC control unit will detect any failure (e.g. in the communication with the processing module or severe failure of the processing module itself), at which point, the HVAC control module can be configured to actuate the fallback policy as described hereinabove.
c. The result of a command received and handled by the HVAC control module can be reported back to the processing module, which may forward it to be stored in the library.

In certain exemplary implementation, the systems provided herein, using the libraries provided to implement the methods disclosed further comprise a multi-directional, or direction-adjustable air-inlet module (see e.g., FIGS. 6-10), adapted to provide selectable inflow of air from a discrete direction, whether pre-processed or direct fresh air. Consequently, the ventilation direction is configured to draw air from the air inlet direction associated with the lowest determined pollutants' concentration immediately outside the multi-storied structure (i.e. the available outdoor air as defined herein). It is noted, that the air inlet can be located at various heights along the multi-storied enclosed structure, and air inflow can be configured to be taken from any height so as to minimize internal air pollution.

In certain exemplary implementation, the systems provided herein, using the libraries provided to implement the methods disclosed, further comprise a bypass outlet and a three-way valve and a secondary fan, adapted to provide a selectable bypass flow of air from the inlet directly to the bypass outlet. This allows maintaining a residual air flow through the inlet also in times when outdoor air supply is stopped, thus preventing persistence of high contaminant levels inside the ducts to the time when the air supply to the structure is restored. The secondary fan may be lighter than the main fan, designed only to circulate air through the volume of the ducts between the inlet and outlet and not through the entire volume of the structure, thus consuming less power than the main fan. In examples, the bypass outlet and three-way valve and the secondary fan are operable to be used in conjunction with measured temporal data of pollution of the available outdoor air. The optimization strategy my then be configured to consider the time it takes a parcel of air to travel from the inlet to the three-way valve.

In certain exemplary implementation, the systems provided herein, using the libraries provided to implement the methods disclosed, further comprise ventilation outlets into unoccupied spaces (for example unoccupied rooms and hallways and volumes above ceiling and below floors) as well as vents, ducts or openings allowing free exchange of air between these spaces and the occupied spaces. This may extend the duration that the outdoor air supply to the structure can be stopped, which in turn may improve the ability of the optimization strategy to reduce indoor air pollution due to outdoor sources. In certain examples, ventilation of these unoccupied spaces, as well as the air flow between these spaces and occupied spaces, are operably configured to be active and selectable. Such implementations may comprise a baffle which the system may command in order to selectably ventilate unoccupied spaces. These embodiments may also comprise a light fan, ducts and vents or openings, adapted to selectably establish circulating airflow between occupied and unoccupied spaces. The optimization strategy may then be configured to utilize ventilation of the unoccupied spaces and circulation air flow between occupied and unoccupied spaces.

As indicated, the methods disclosed, implementable using the systems provided using the libraries are computerized methods utilizing processor-readable media such as various computer programs. The computer programs (software and/or firmware), can comprise program code means for carrying out the steps of the methods described herein, as well as a computer program product comprising program code means stored on a medium that can be read by a computer, such as a floppy disk, a hard disk, CD-ROM, DVD, USB memory stick, or a storage medium that can be accessed via a data network, such as the Internet or Intranet, when the computer program product is loaded in the main memory of a computer and is carried out by the computer. Thus, the terms "non-transitory storage medium" and "non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Accordingly and in certain exemplary implementation, provided herein is a processor-readable media in communication with and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects, linked to the first, second, and third ventilation-associated parameters as well as to the heating and air-conditioning associated parameter related to the internal and external temperature of the multi-storied structure, the processor-readable media having a set of executable instructions, which, when executed, are configured to cause a processor to: receive a ventilation request prompt from a heating, ventilation and air conditioning (HVAC) system; response to the ventilation request, select a set of operations configured to achieve a predetermined optimization objective; associate the selected set of operations with the ventilation request; create a set of process commands within the ventilation request; form a ventilation command, wherein the set of master process objects in the library are linked to the ventilation command without copying the master process objects into the ventilation command; and execute the set of ventilation associated process operations in the ventilation command.

Memory device(s) as used in the methods described herein can be any of various types of non-transient memory devices or storage devices (in other words, memory devices that do not lose the information thereon in the absence of power). The term "memory device" is intended to encompass an installation medium, e.g., a CD-ROM, floppy disks, or tape device or a non-transient memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Further, the processor may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads).

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "communication processing module" (CPM), "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information.

Note that if the processor, module, servers, network switches etc., processing circuit, and/or processing unit includes more than one processing device, the processing devices may be centrally located or may be distributed (e.g., cloud computing via indirect coupling via a local area network and/or a wide area network). Still further it is noted that, the memory element may store, and processor, module, processing circuit, and/or processing unit executes, hard coded and/or operational instructions corresponding to at least some of the steps and/or functions illustrated in one or more of FIG. 1 elements. Such a memory device or memory element can be and is included in certain exemplary implementation as an article of manufacture.

Figure 2:
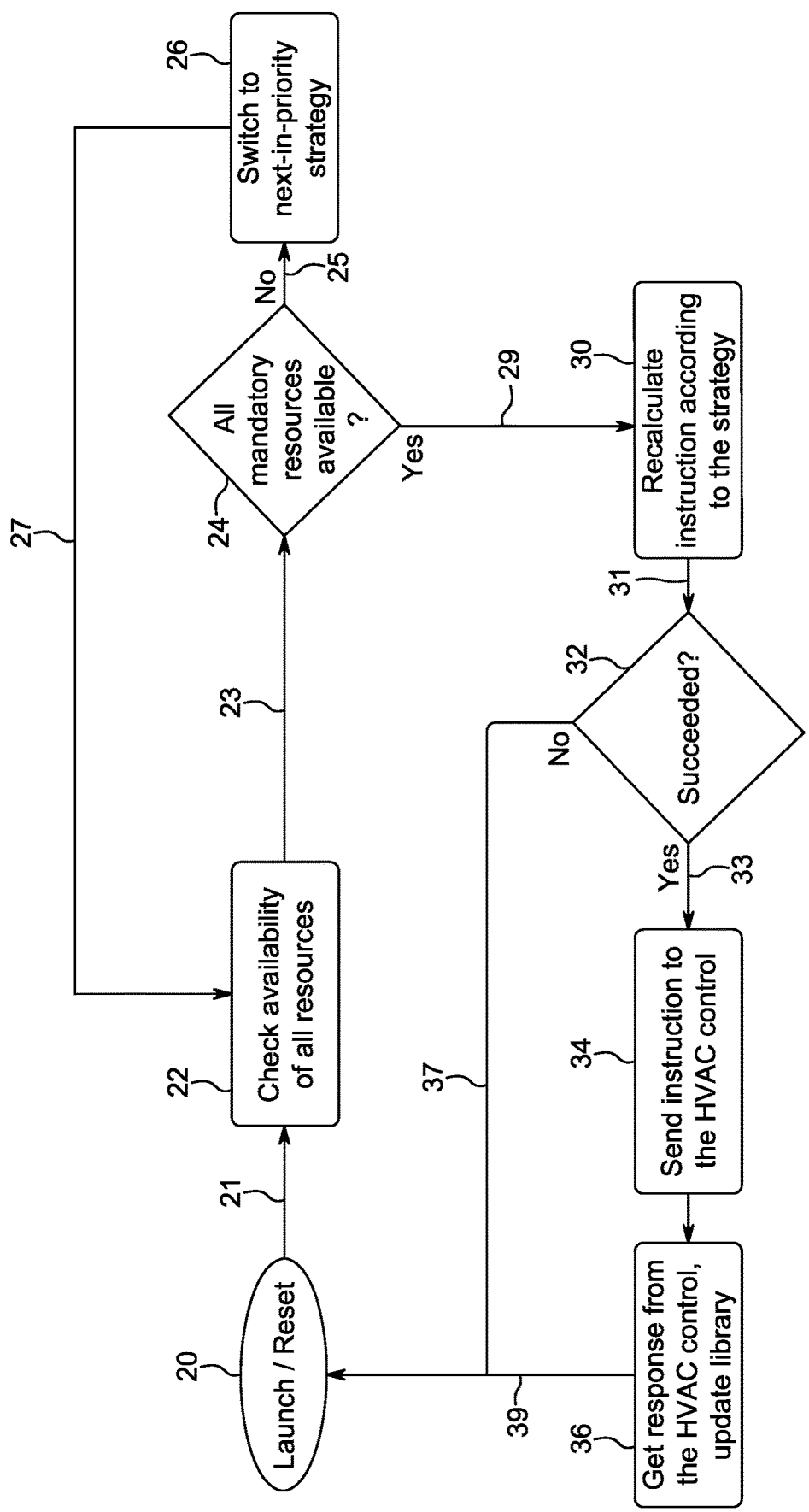
FIG. 2, is a schematic illustrating the decision flow for selecting the optimal strategy to achieve a certain objective based on available resources.

With reference now to the figures and in particular with reference to FIGS. 1-2, exemplary flowcharts of data processing environments are provided in which illustrative embodiments may be implemented. It should be appreciated that FIGS. 1-10 are only exemplary and are not intended to assert or imply any limitation with regard to the environments in which different embodiments may be implemented. Many modifications to the depicted environments may be made.

Turning now to FIG. 1 and FIG. 2, illustrating the system components and the interrelationships between these components. As illustrated, different elements of the system may depend in their operation on input and feedback from other components. For example, availability of one element of the system may be mandatory for the functionality of another element (e.g., master-slave relationship, thus not selectable). In another embodiment, reducing exposure to a certain contaminant of outdoor source, incorporating a single input channel $150_i$ from outdoor sensor $600_p$ (not shown) of that contaminant and a main strategy. The availability of the outdoor data 151 may be mandatory for the strategy to be carried out, and that sensor 107 input data 151 is unavailable, processing unit 200 will search library 100 for another strategy $102_k$, which either; does not depend on availability of outdoor sensor 107 data 151 to operate, or can be calculated based on indoor data. In other cases, availability of one element of the system may not be mandatory for the functionality of another element, but rather defined as assisting it or enhancing its performance. Thus, as described above, assuming additionally that library 100 contains measured indoor concentrations of a particular contaminant (e.g., NOx), received through input channel $150_i$ from indoor sensor 106 (not shown), and also via calculation, which allows estimating the indoor concentration of the contaminant based only on the measured outdoor concentration using outdoor sensor 107 and the ventilation history (not shown, referring to previous time and concentrations of the contaminants as measured by indoor sensor 106). In this case, data 151 from indoor sensor 106 may not be mandatory for the functionality of the strategy and its unavailability will not result in unavailability of the latter.

As illustrated in FIGS. 1-4 input channels $150_i$ feed changes to items $111_j$ of database 110. Upon initiation, 40, processing module 200 loads 101 available optimization strategy 74 and associated models $102k$ from library 100 and executes two kinds of operations: Responds 212 to updates of the data in database 100 by, for example, recalculating the instruction of the loaded strategy and actuates that instruction by sending a command 220 to HVAC system through the HVAC control module 400. HVAC control module 400 responds to command 220 with feedback 401 which may be forwarded 212 to be saved in database 110. Processing module 200 then responds 22 to changes in the availability status of different items of library 110 by checking whether the active strategy is still available 24 (see e.g., FIG. 2), in other words, if all the other library items $102k$, which are mandatory for its functionality are available 24. In case that the active strategy is found to be unavailable 25, processing module 200 loads the next-in-priority strategy 26 until an available strategy is found (in terms of available necessary resources as per 22). Such strategy can always be found, since the fallback strategy and all the components mandatory to its functionality are a physical part of processing module 200 itself. HVAC control module 400 actuates the required changes in the state of the HVAC system and also makes a final validation of the changes with respect to prerequisites 302, overriding them according to the fallback strategy described hereinabove, if violations of prerequisites 302 are detected. When the system is launched 20 processing module 200 is initialized 20 with the optimization objectives based on the preselected optimization strategy 74 loaded $102k$ from library 100 and HVAC control module 400 is initialized with prerequisites 302.

As illustrated in FIGS. 1, and 2, processing module 200, upon launch or after reset 20, will monitor 21 the availability of all library items 22 to see if there are changes to any parameter $111_j$ and dynamically changed thresholds stored in library 100 or in database 110. If changes are found, processing module 200 will communicate 202 with library 100, to choose the highest priority strategy 26 available and again communicate with library 100 to recheck 22 the strategy's resources' availability, then 24 if the strategy is unavailable 25, choose the highest priority strategy 74 available and again communicate with library 100 to recheck 22 the strategy's resources' availability. If however the strategy's resources' are available 29, the strategy's instructions are obtained from library 100 and recalculated 30 with the updated data from database 100, whereupon if the recalculation is unsuccessful 37, the process resets 20, otherwise 33 instructions are sent 34 to HVAC control module 400 whereupon, processing module 200 receives feedback 401 following operation of the HVAC control module 400 and reinitiates 21 the recheck of the strategy's availability 22.

Figure 3:
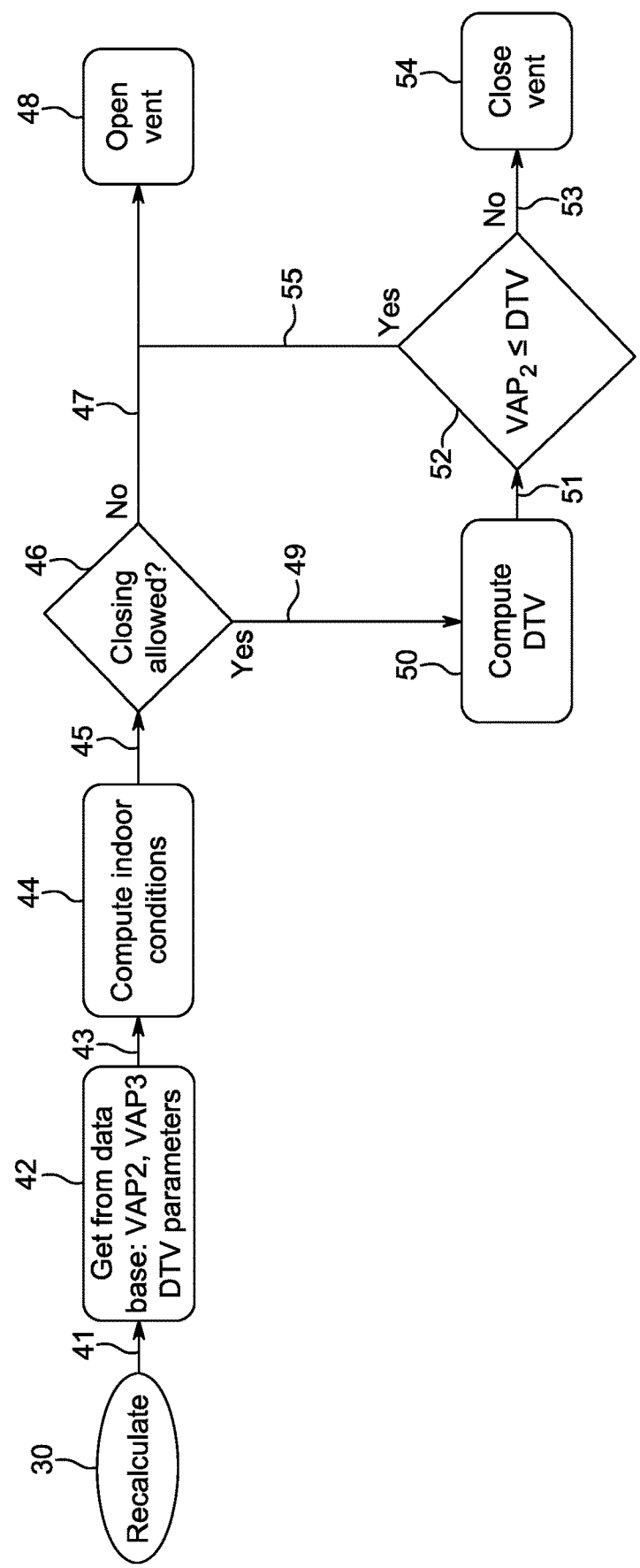
FIG. 3, is a schematic illustrating the command flow for actuating ventilation based computed DTV.

Turning now to FIG. 3, is an illustration of the logic of the "Dynamic Threshold Value" (DTV) binary strategy. As illustrated, upon receiving command from processing module 200 the process is initialized 40 and required data is collected 42 from database 110, the data is retrieved 43 to the processing module 200, where indoor conditions are further computed 44 and queried as to whether the indoor conditions in the structure allow closing of the vent 46. If it is found that closing of the vent is forbidden at the current instant 47, the vent is opened 48. If closing of the vent is allowed 49, the collected data is used to compute the dynamic threshold value 50, which is then 51 compared to the current value of VAP2 52. If the current value of VAP2 is lower than or equals to the DTV 55, the vent is opened 48, otherwise 53 the vent is closed 54.

Figure 4:
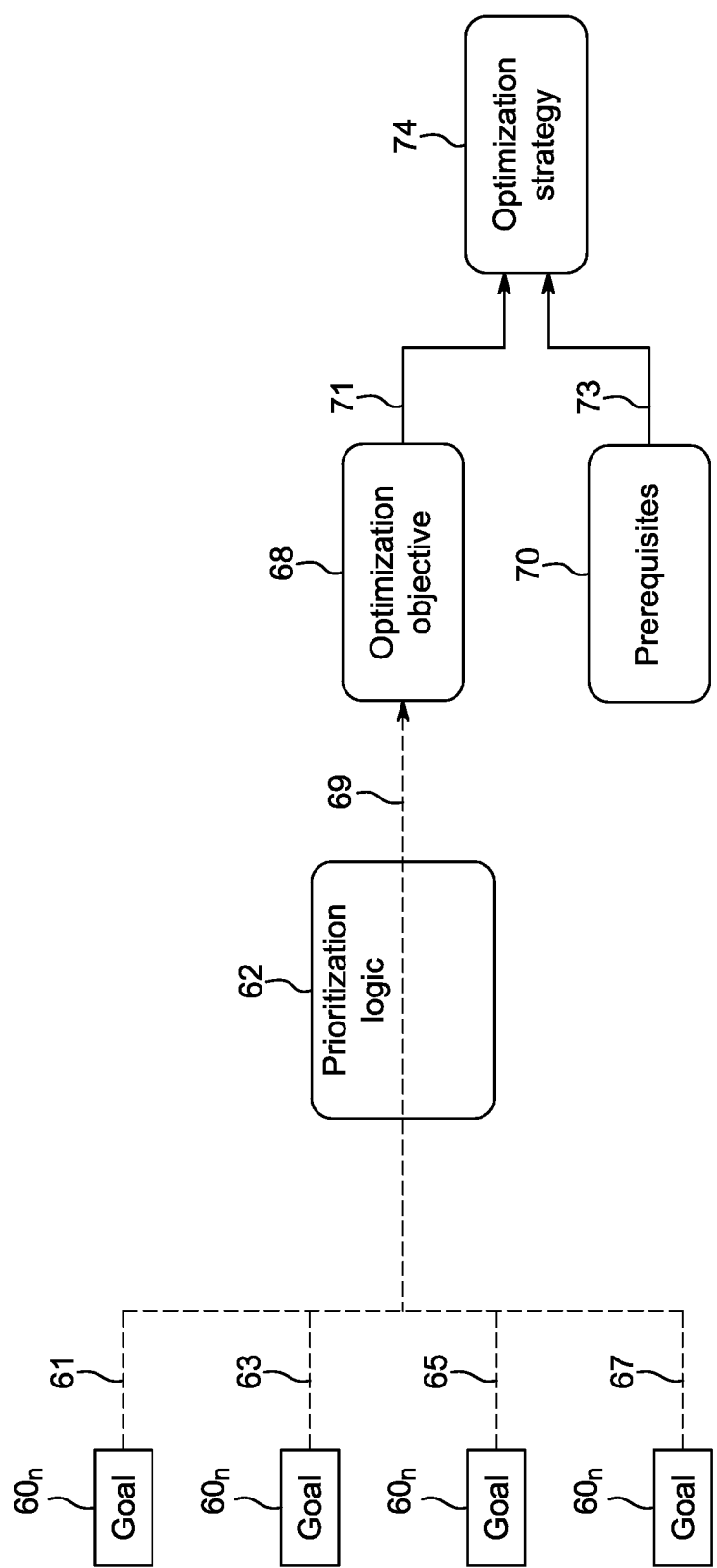
FIG. 4, illustrates the processor's logic in selecting optimization strategy.

Turning now to FIG. 4, which is a schematic description of the optimization objective 68 is comprised of a set of optimization goals 60$_n$ and a prioritization logic 62. FIG. 4 outlines what are the outcomes that the system should pursue. Prerequisites 70 are a list of demands that must be met at all time by the system. Optimization strategy 74 defines the set of executable operations actuated by processor 200 and followed by the system using library 100 and database 110 to pursue optimization strategy 74, while complying with prerequisites 701, for example maintaining $CO_2$ levels at a predetermined concentrations.

Figure 5:
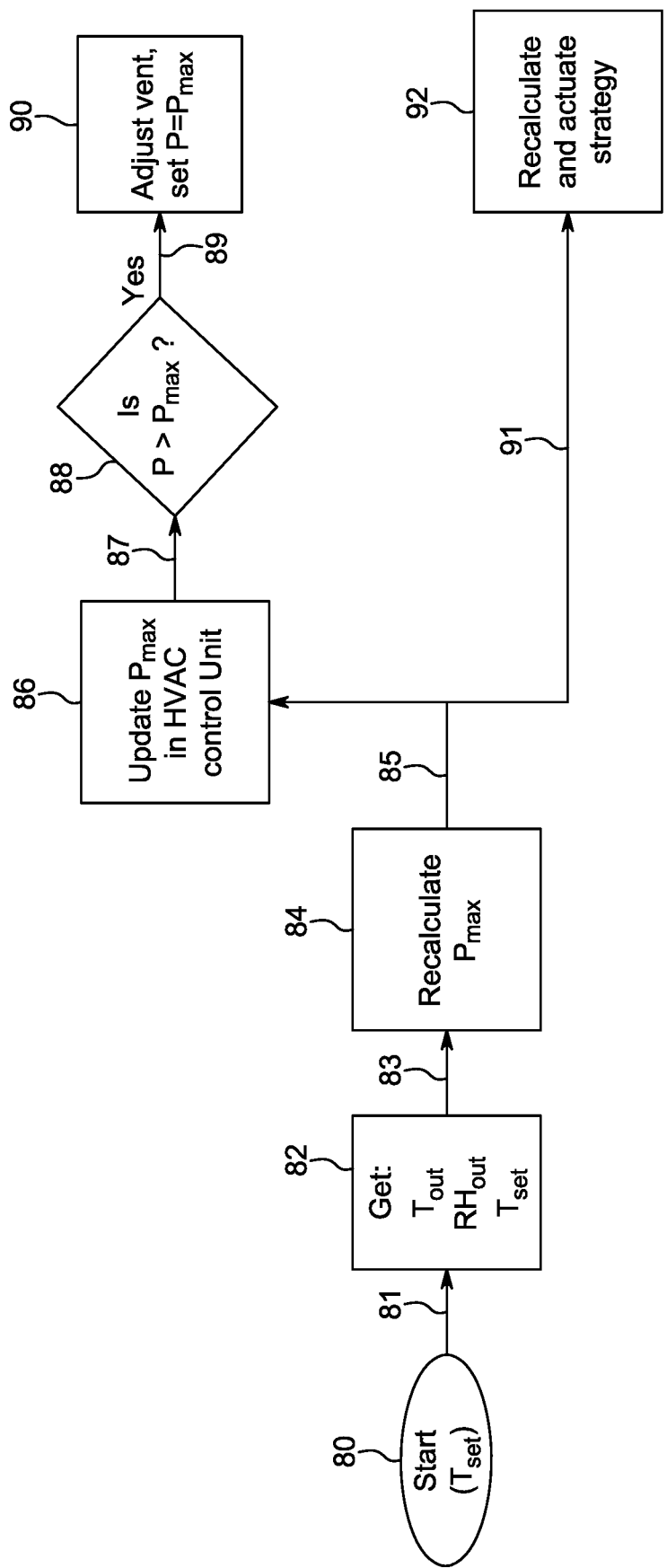
FIG. 5, is a schematic illustrating the logic in accounting for condensation in the ventilation system.
Figure 6:
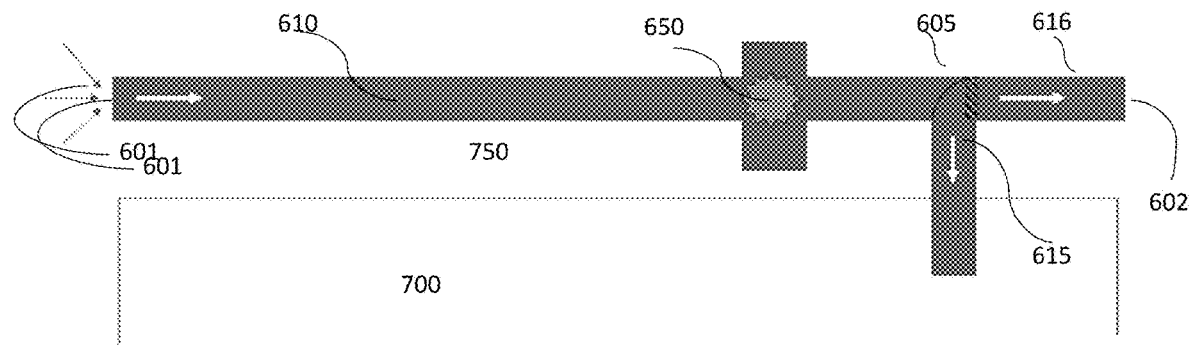
FIGS. 6-10 illustrates schematics of various embodiments of primary and secondary external and internal vents' configurations.

Turning now to FIG. 5, which is an illustration of the logic executed, when actuated by processing unit 200 in case that the maximal power of outdoor airflow should be adjusted according to the outdoor temperature ($T_{out}$) and relative humidity ($RH_{out}$) and to the indoor set temperature ($T_{set}$). As illustrated, upon initiation 80 processing module 200 reads the current outdoor temperature and relative humidity 82, recalculate the maximum vent power ($P_{max}$) 84, which would still comply with the defined prerequisites such as eliminating condensation, send 85 the new value of $P_{max}$ to be updated 86 in the HVAC control module 400 (so it can be used by HVAC control module 400), then recalculate the instruction of the strategy according to the new value of $P_{max}$ and actuate the ventilation 88 with HVAC control module 400. Additionally, the HVAC control unit 400 checks whether the current power of the vent, P, is larger than $P_{max}$, 88 in which case 89 it immediately reduces P to be equal to $P_{max}$ 90. In addition, processing module 200, after reading the current outdoor temperature and relative humidity 82, and recalculating the maximum vent power ($P_{max}$) 84, sends command 91, to (if necessary), recalculated and actuate optimization strategy 74 (see e.g., FIG. 4).

Turning now to FIGS. 6-10, which are schematics illustrations of various embodiments of primary and secondary vents' configurations. As illustrated for example in FIG. 6, air enters through main conduit 610 where sensors can monitor air quality at the inlet 601, with fan unit 650 having inlet 601 and outlet 602 configured to move the air through post fan duct 616 towards valve 605 that is based on HVAC control module 400, in communication with processing module 200, will determine whether to allow the air to flow into structure inlet duct 615, or have the air exit without entering the structure through outlet duct 614 having exit 604. In other words, main conduit 610 conveys outdoor air from the inlet (601,—opening of main conduit 610). The air quality is measured at the inlet (601). Three-way valve 605 can then be switched between routing the air into the building 700 or exhausting the air out 602.

Figure 7:
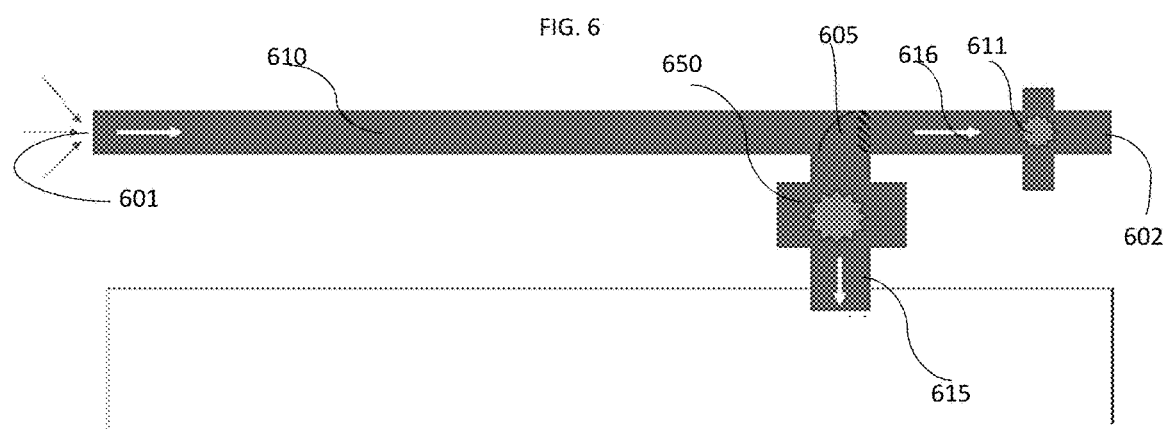

Alternatively or additionally, as illustrated in FIG. 7, additional light fan unit 611 allows replacement of the air inside main conduit 610, also when the fan unit 650 is not activated to ventilate the multi-storied enclosed structure.

Figure 8:
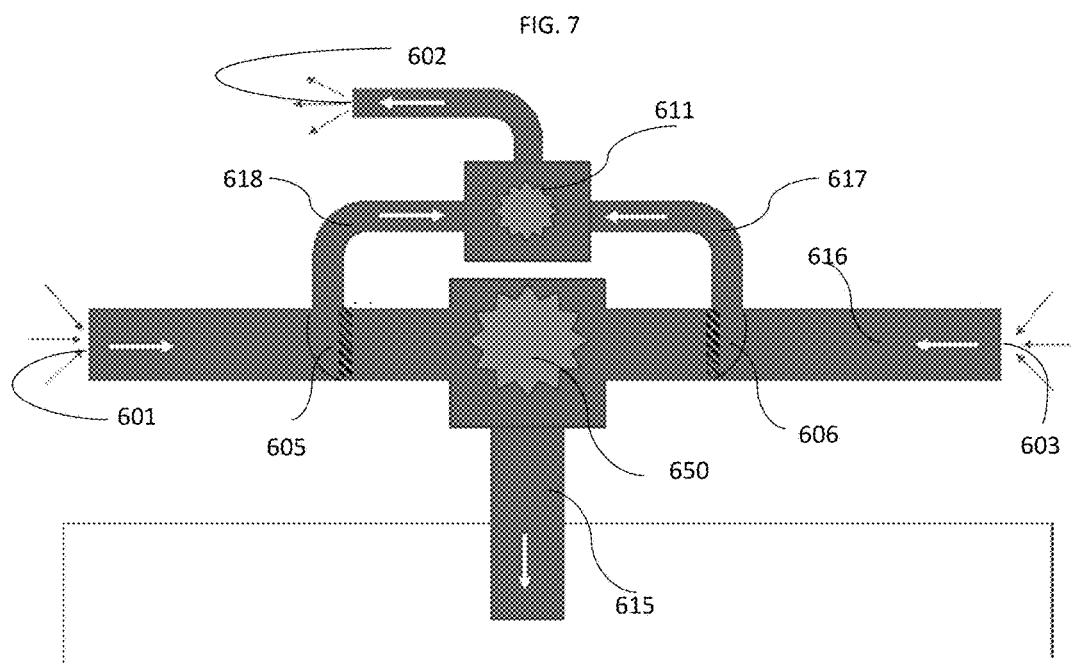

FIG. 8, illustrates a configuration allowing for selectable air inlet from 2 directions, with controllable baffles 605, 606 and secondary, light fan unit 611 with inlet ducts 617, 618 extending at opposite directions from main fan unit 650. In certain exemplary implementation, processing module 200 can be configured to, when executed by the programs disclosed, to cause at least one processor to initiate airflow to main conduit 610, from directions of inlet 601, 603 that will have the lowest concentration of outdoor air pollutant, or in another embodiment, airflow to main conduit 610, from directions of inlet 601, 603 that will provide the most optimal results for energy conservation in the multi-storied enclosed structure. That latter main conduit 610 can be the same or different than the former. In certain exemplary implementation, secondary fan 611 can be configured, when executed, to maintains weak airflow through the inlets 601, 603 into the exhaust 602, at times when inlets 601, 603 are not supplying air to structure 700 (see e.g., FIG. 6)

Figure 9:
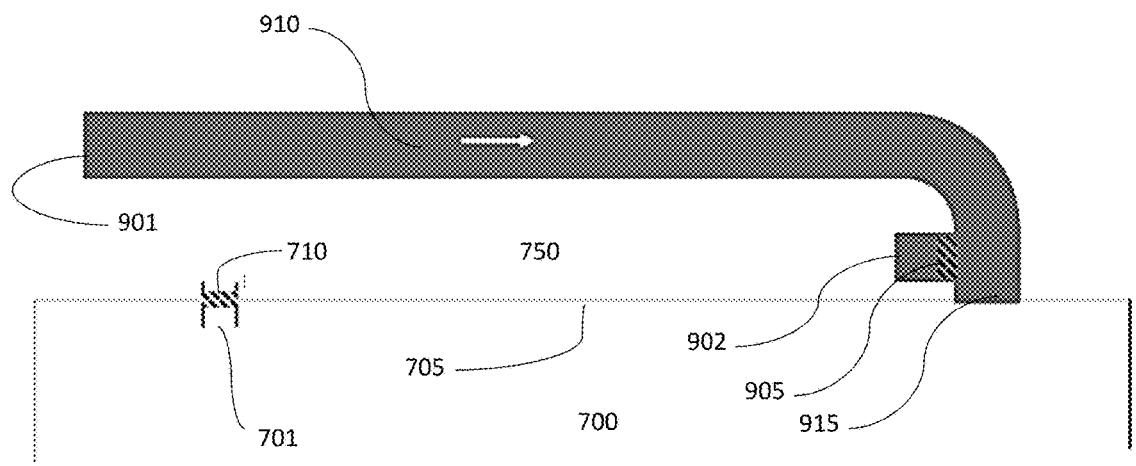

Turning now to FIG. 9, illustrating ventilation inlet duct configuration placed at the space 750 above drop ceiling 705 of space 700 inside the multi-storied enclosed structure. As illustrated, internal inlet duct 901, in communication with external main conduit 610, has two outlets (vents). The first 915 opens to the space 700 below the drop ceiling 705, and the second, 902 opens to space 750 above drop ceiling 705. Also shown is baffle 905. HVAC control module 400 (not shown), using the systems and processing module 200 provided herein, can be configured to use the volume 750 above drop ceiling 705 to store fresh air. Valves 710 located in openings 701 in the ceiling 705 and in the internal inlet duct 901 allow determining whether the air is blown into volume 750 above drop ceiling 705 or not and whether passive passage of air between volume 750 and the room (700) through ceiling opening 701 is allowed or not.

Figure 10:
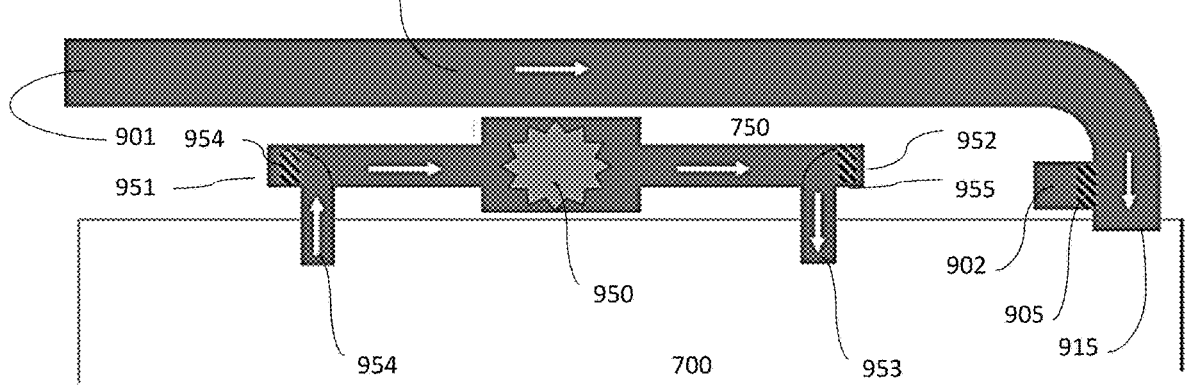

Similarly, FIG. 10, illustrates another embodiment of the ventilation inlet duct configuration placed at the space above drop ceiling 705 of a space inside the multi-storied enclosed structure. As illustrated, an additional internal light fan unit 950 having inlets/outlets 951 and 952 opening into the space below drop ceiling 705, and additional inlets/outlets 953 and 954, opening into the space 705 above drop ceiling 705. Also shown are baffles (or valves) 905, 954, and 955. In this configuration, it is possible to recirculate air inside space 700 below drop ceiling 705, while shutting off three way valve 905, opening baffles 954 and 955, thus driving the impact (in other words, accelerating the air replacement) within the space below drop ceiling 705. In certain exemplary implementation, the systems provided herein, comprise the ventilation inlet duct configuration placed at the space below drop ceiling of a space inside the multi-storied enclosed structure as substantially illustrated in FIGS. 6-10. Likewise, unit 950 located in the room allow active transfer of air between the room 700 and volume 750 above drop ceiling 705.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stream(s) includes one or more stream). Reference throughout the specification to "one implementation", "another exemplary implementation", "certain exemplary implementation", "an operable example" and so forth, when present, means that a particular element (e.g., feature, structure, and/or characteristic), or elements described in connection with certain implementations, executions, operations, and working examples, is/are included in at least one such implementation described herein, and may or may not be present in other implementations, executions, operations, and working examples. In addition, it is to be understood that the described elements may be combined in any suitable manner in the various exemplary implementations.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Accordingly and in an exemplary implementation, provided herein is a processor accessible library comprising control information for a multi-storied structure's heating, ventilation and air conditioning (HVAC) process, wherein said library is configured to implement methods to identify optimized period for ventilation and/or heating and air conditioning, employing dynamic ventilation criteria, and wherein the library further contains external and internal HVAC parameters, wherein (i) the ventilation parameters comprise: a first ventilation-associated parameter (VAP1), related to the inside of the multi-storied structure; a second ventilation-associated parameter (VAP2), related to the outside of the multi-storied structure; and a third ventilation-associated parameter (VAP3), related to temporal ventilation history, wherein the library further comprises a plurality of master process objects linked to the first, second, and third ventilation-associated parameters, and (ii) further comprised of: a fourth ventilation-associated parameter ($VAP_4$), related to a hub encompassing the enclosure; and a fifth ventilation-associated parameter ($VAP_5$), designating the location of the enclosure within the hub, wherein the library further comprises a plurality of master process objects linked to the fourth, and fifth ventilation-associated parameters, and (iii) further comprised of: a sixth heating and air-conditioning associated parameter ($HACAP_6$), related to an internal temperature of the enclosure; and a seventh heating and air-conditioning associated parameter ($HACAP_7$), related to an external temperature of the enclosure, wherein the library further comprises a plurality of master process objects linked to the sixth, and seventh ventilation-associated parameters, wherein (iv) the library is configured such that said control information is modifiable by a user, wherein (v) a set of operations configured to achieve a predetermined optimization objective from the plurality of master process' optimization sub-goals in the library is configured to be selectable, wherein (vi) the first ventilation-associated parameter ($VAP_1$), comprise selectibly determined pollutants' concentration within the multi-storied structure; the second ventilation-associated parameter ($VAP_2$), comprise selectibly determined pollutants' concentration immediately outside the multi-storied structure, wherein (vii) a rule-based algorithm is configured to select the set of master process' objectives configured to minimize pollution within the multi-storied enclosure and minimize the energy requirements of the heating and air-conditioning process, (viii) the optimization objectives comprise: reduction of concentration of indoor and/or outdoor sourced pollutants, maximizing incoming air flow, maintaining internal temperature range, minimizing a breach period, minimizing energy requirement by the HVAC system, or a combination of optimization objectives comprising the foregoing, wherein (ix) the library is dynamically linked to at least one remote database, (x) the library further comprises parameters associated with physical properties of the multi-storied structure, physical properties of the HVAC system, topographical and/or geographical characteristics of the immediate surroundings of the multi-storied structure, occupancy in the multi-storied structure, meteorological data, or a combination of parameters comprising the foregoing, wherein (xi) the library further comprising an eighth heating and air-conditioning associated parameter ($HACAP_8$), the eighth heating and air-conditioning associated parameter ($HACAP_8$) comprising wet bulb temperature, and (xii) a parameter associated with minimally required external air supply.

In another exemplary implementation, provided herein is a computerized method for optimizing heating, ventilation and air conditioning (HVAC) process in a multi-storied structure implementable in a system comprising the multi-storied structure, a heating, ventilation and air conditioning (HVAC) system, a processing module in communication with a non-volatile memory having thereon a processor-readable media and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects comprised of a plurality of sub-goals, with a dynamic threshold value, the dynamic threshold value linked to the first, second, and third ventilation-associated parameters as well as to the heating and air-conditioning associated parameter related to the internal and external temperature of the multi-storied structure; the method comprising: responsive to a ventilation prompt, selecting a set of operations configured to achieve a predetermined optimization objective from the plurality of master process' optimization objectives in the library; associating the selected set of operations to create a set of process commands within the ventilation request and forming a ventilation command, wherein the set of master process objects in the library are linked to the ventilation command without copying the set of master process objects into the ventilation command; and executing the ventilation command, wherein (xiii) selecting a set of master process object from the plurality of master process objects in the library is implemented using rule—based algorithm, wherein (xiv) the first ventilation-associated parameter ($VAP_1$), comprise selectibly determined pollutants' concentration within the multi-storied structure; and the second ventilation-associated parameter ($VAP_2$), comprise selectibly determined pollutants' concentration immediately outside the multi-storied structure, wherein (xv) the system further comprises a multi-directional air-inlet module, adapted to provide selectable inflow of air from a discrete direction (azimuth), wherein (xvi) the optimization objective is comprised of at least one of a plurality sub-goals of: reduction of concentration of indoor and/or outdoor sourced pollutants, maximizing incoming air flow, maintaining internal temperature range, minimizing a breach period, minimizing energy requirement by the HVAC system, or a combination of sub-goals comprising the foregoing, (xvii)

the library further comprises parameters associated with physical properties of the multi-storied structure, physical properties of the HVAC system, topographical and/or geographical characteristics of the immediate surroundings of the multi-storied structure, occupancy in the multi-storied structure, meteorological data, or a combination of parameters comprising the foregoing, wherein (xviii) the rule-based algorithm is configured to select the set of master process objects configured to minimize pollution within the enclosure and minimize the energy requirements of the heating and air-conditioning process, (xix) the library further comprises: a fourth ventilation-associated parameter ($VAP_4$), related to a hub encompassing the enclosure; and a fifth ventilation-associated parameter ($VAP_5$), designating the location of the enclosure within the hub, wherein the library further comprises a plurality of master process objects linked to the fourth, and fifth ventilation-associated parameters, the method (xx) further comprising a step of determining a wet bulb temperature and limiting air flow so as to prevent condensation of moisture in the HVAC system, wherein (xxi) the ventilation direction is configured to draw air from the air inlet direction associated with the lowest determined pollutants' concentration immediately outside the multi-storied structure, (xxii) the library further comprises a parameter associated with minimally required external air supply, wherein (xxiii) the library further comprises a parameter associated with minimally required external air supply, wherein (xxiv) the step of executing the ventilation command further comprises maintaining a predetermined air pressure differential between portions of the enclosed structure, (xxv) wherein maintaining predetermined air pressure differential between portions of the enclosed structure comprises controlling exhaust ventilation air flow and the fresh air airflow, wherein (xxvi) the dynamic threshold is varied as a function of an expected energy requirement by the fresh air system, the method (xxvii) further comprising calculating the expected energy requirement based on forecasted weather parameters, wherein (xxviii) the step of executing the ventilation command further comprises ventilating unoccupied portions of the enclosed structures, or the whole unoccupied enclosed structure, the method (xxix) further comprising: activating, deactivating and tuning components of the HVAC system to improve energy efficiency, (xxx) the HVAC system's components are at least one of: chillers, heat-pumps, fan coils, heating coils, heat exchangers, cooling towers, water pumps, motors, fans, and compressors, (xxxi) the energy efficiency improved is at least one of: Watts, coefficient of performance (COP), and energy efficiency ratio (EER), wherein (xxxii) the step of executing the ventilation command further comprises controlling at least one of: baffles, and dumpers each affecting outdoor air flow distribution between different sub-zones in the structure, and the method (xxxiii) further comprising: detecting a faulty component of the HVAC system, or an improper distribution of fresh air flow in the enclosed structure or in a portion thereof; and upon detecting a faulty component, issuing an alert.

In yet another exemplary implementation, provided herein is a processor-readable media in communication with and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects with dynamic threshold, linked to the first, second, and third ventilation-associated parameters as well as to the heating and air-conditioning associated parameter related to the internal and external temperature of the multi-storied structure, the processor-readable media having a set of executable instructions, which, when executed, are configured to cause at least one processor to: receive a ventilation request prompt from a heating, ventilation and air conditioning (HVAC) system; responsive to the ventilation request, select a set of operations configured to achieve a predetermined optimization objective from the plurality of master process objects in the library; associate the selected set of operations with the ventilation request; create a set of process commands within the ventilation request; form a ventilation command, wherein the set of master process objects in the library are linked to the ventilation command without copying the set of master process objects into the ventilation command; and execute the set of ventilation associated master process objects in the ventilation command, wherein (xxxiv) a set of master process objects is configured to be selectable from the plurality of master process objects in the library using a rule—based algorithm, (xxxv) the optimization objective is comprised of at least one of a plurality sub-goals of at least one of: reduction of concentration of indoor, outdoor sourced pollutants, maximizing incoming air flow, maintaining internal temperature range, minimizing a breach period, minimizing energy requirement by the HVAC system, and a combination of sub-goals comprising the foregoing, (xxxvi) the library further comprises: a fourth ventilation-associated parameter ($VAP_4$), related to a hub encompassing the enclosure; and a fifth ventilation-associated parameter ($VAP_5$), designating the location of the enclosure within the hub, wherein the library further comprises a plurality of master process objects linked to the fourth, and fifth ventilation-associated parameters, wherein (xxxvii) when executed, the at least one processor is further configured to modify control information using a user input, (xxxviii) the user input comprise: feedback input from the HVAC system and/or sensors measuring its performance, input from sensors monitoring levels of contaminants at specified locations, or their combination, and wherein (xxxix) when executed, the processor readable media is further configured to cause the at least one processor to determine a wet bulb temperature and limit air flow so as to prevent condensation of moisture in the HVAC system.

In another exemplary implementation, provided herein is a method for adaptive optimization of heating, ventilation and air conditioning (HVAC) process in a multi-storied structure implementable in a system comprising the multi-storied structure, a heating, ventilation and air conditioning (HVAC) system, a processing module in communication with a non-volatile memory having thereon a processor-readable media and a library comprising: a first ventilation-associated parameter ($VAP_1$), related to the inside of the multi-storied structure, a second ventilation-associated parameter ($VAP_2$), related to the outside of the multi-storied structure, a third ventilation-associated parameter ($VAP_3$), related to temporal ventilation history, an air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects comprised of a plurality of sub-goals, with a dynamic threshold value, the dynamic threshold value linked to the first, second, and third ventilation-associated parameters as well as to the heating and air-conditioning associated parameter related to the internal and external temperature of the multi-storied structure; the method comprising: selecting a historical dataset comprising a first set of forecast pollutants' values received from one or more predictive forecast statistical models and a first set of actual pollutants' values received from one or more measurements of the pollutants; generating one or more variants of machine learning models to model performance of the one or more predictive forecast models by training the one or more variants of the machine learning models on the historical dataset; receiving a current dataset comprising a second set of forecast pollutants' values derived from the one or more predictive forecast models and a second set of actual pollutants' values derived from the one or more measurements of the pollutants; correlating the current dataset with the historical dataset to adaptively obtain a filtered historical dataset; selecting the one or more variants of the machine learning models trained on the historical dataset and evaluating them on the filtered historical dataset to assign weights to each of the one or more variants of the machine learning models and their outputs; and deriving a statistical model in the form of an optimal combination function to determine at least one combined forecast pollutants' value by combining weights assigned to each of the one or more variants of the machine learning models trained based on the evaluating of the one or more variants of the machine learning models on the filtered historical dataset and the outputs of the each of the one or more variants of machine learning models trained on the historical dataset, wherein the selecting, the generating, the receiving, the correlating, the evaluating and the deriving are performed by the processor using computer-readable instructions stored in the memory, wherein (xl) the one or more predictive forecast models include a supervisory control and data acquisition (SCADA) model, a physical model including numerical pollutants' reaction kinetics prediction model, a statistical model, a machine learning model, an alternate forecast model, or combinations thereof, and wherein (xli) the one or more variants of the machine learning models include Artificial Neural Networks (ANNs), basis function models, kernel methods, support vector machines, decision trees, variation methods, distribution sampling methods, ensemble methods, graphical models, search methods, or combinations thereof.

Although the foregoing disclosure has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A processor accessible library comprising control information for a multi-storied structure's heating, ventilation and air conditioning (HVAC) process, wherein said library is configured to implement methods to identify optimized period for ventilation and/or heating and air conditioning, employing dynamic ventilation criteria, wherein the library further contains external and internal HVAC parameters, and whereupon identifying optimized period for ventilation and/or heating and air conditioning, actuate an HVAC system of the multi-storied structure, the dynamic ventilation criteria comprise:
   a. a second ventilation-associated criterion ($VAP_2$), related to the outside of the multi-storied structure;
   b. a third ventilation-associated criterion ($VAP_3$), related to temporal ventilation history;
   c. a fourth ventilation-associated criterion ($VAP_4$), related to hub encompassing the enclosure; and
   d. a fifth ventilation-associated criterion ($VAP_5$), designing the location of the enclosure within the hub, wherein the library further comprises a plurality of master process objects linked to the second, third fourth, adn fifth ventilation-associated criteria.

2. The library of claim 1, further comprised of:
   a. a sixth heating and air-conditioning associated parameter ($HACAP_6$), related to an internal temperature of the enclosure; and
   b. a seventh heating and air-conditioning associated parameter ($HACAP_7$), related to an external temperature of the enclosure, wherein the library further comprises a plurality of master process objects linked to the sixth, and seventh ventilation-associated parameters.

3. The library of claim 2, wherein the library is configured such that said control information is modifiable by a user.

4. The library of claim 2, wherein a set of operations configured to achieve a predetermined optimization objective from the plurality of master optimization sub-goals in the library is configured to be selectable.

5. The library of claim 4, wherein the library further comprises: a first ventilation-associated parameter ($VAP_1$), related to the inside of the multi-storied structure, comprising selectibly determined pollutant concentration within the multi-storied structure; the second ventilation-associated parameter ($VAP_2$), comprises selectibly determined pollutant concentration immediately outside the multi-storied structure.

6. The library of claim 5, wherein a rule-based algorithm is configured to select the set of master process objects configured to minimize pollution within the multi-storied enclosure and minimize the energy requirements of the heating and air-conditioning process.

7. The library of claim 6, wherein the optimization objectives comprise: reduction of concentration of indoor and/or outdoor sourced pollutants, maximizing incoming air flow, maintaining internal temperature range, minimizing a breach period, minimizing energy requirement by the HVAC system, or a combination of optimization objectives comprising the foregoing.

8. The library of claim 7, wherein the library is dynamically linked to remote databases.

9. The library of claim 8, wherein the library further comprises parameters associated with physical properties of the multi-storied structure, physical properties of the HVAC system, topographical and/or geographical characteristics of the immediate surroundings of the multi-storied structure, occupancy in the multi-storied structure, meteorological data, or a combination of parameters comprising the foregoing.

10. The library of claim 7, further comprising an eighth heating and air-conditioning associated parameter ($HACAP_8$), the eighth heating and air-conditioning associated parameter ($HACAP_8$) comprising wet bulb temperature.

11. The library of claim 1, further comprising a parameter associated with minimally required external air supply.

12. A computerized method for optimizing heating, ventilation and air conditioning (HVAC) process in a multi-storied structure implementable in a system comprising the multi-storied structure, a heating, ventilation and air conditioning (HVAC) system, a processing module in communication with a non-volatile memory having thereon a processor-readable media and a library comprising: a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects comprised of a plurality of sub-goals, with a dynamic threshold value, the dynamic threshold value linked to the second, and third ventilation-associated parameters as well as to the heating and air-conditioning associated parameter related to the internal and external temperature of the multi-storied structure; the method comprising:
  a. responsive to a ventilation request, selecting a set of operations configured to achieve a predetermined optimization objective from the plurality of master process optimization objectives in the library;
  b. associating the selected set of operations to create a set of process commands within the ventilation request and forming a ventilation command, wherein the set of master process objects in the library are linked to the ventilation command without copying the set of master process objects into the ventilation command; and
  c. executing the ventilation command.

13. The method of claim 12, wherein selecting a set of master process objects from the plurality of master process objects in the library is implemented using rule-based algorithm.

14. The method of claim 13, wherein the library further comprises: a first ventilation-associated parameter ($VAP_1$), related to the inside of the multi-storied structure, comprising selectibly determined pollutant concentration within the multi-storied structure; and wherein the second ventilation-associated parameter ($VAP_2$), comprises selectibly determined pollutant concentration immediately outside the multi-storied structure.

15. The method of claim 14, wherein the system further comprises a multi-directional air-inlet module, adapted to provide selectable inflow of air from a discrete direction.

16. The method of claim 12, wherein the optimization objective is comprised of at least one of a plurality sub-goals of: reduction of concentration of indoor and/or outdoor sourced pollutants, maximizing incoming air flow, maintaining internal temperature range, minimizing a breach period, minimizing energy requirement by the HVAC system, or a combination of sub-goals comprising the foregoing.

17. The method of claim 12, wherein the library further comprises parameters associated with physical properties of the multi-storied structure, physical properties of the HVAC system, topographical and/or geographical characteristics of the immediate surroundings of the multi-storied structure, occupancy in the multi-storied structure, meteorological data, or a combination of parameters comprising the foregoing.

18. The method of claim 13, wherein the rule-based algorithm is configured to select the set of master process objects configured to minimize pollution within the enclosure and minimize the energy requirements of the heating and air-conditioning process.

19. The method of claim 15, wherein the library further comprises: a. a fourth ventilation-associated parameter ($VAP_4$), related to a hub encompassing the enclosure; and b. a fifth ventilation-associated parameter ($VAP_5$), designating the location of the enclosure within the hub, wherein the library further comprises a plurality of master process objects linked to the fourth, and fifth ventilation-associated parameters.

20. The method of claim 15, further comprising a step of determining a wet bulb temperature and limiting air flow so as to prevent condensation of moisture in the HVAC, system.

21. The method of claim 15, wherein the ventilation direction is configured to draw air from the air inlet direction associated with the lowest determined pollutant concentration immediately outside the multi-storied structure.

22. The method of claim 12, wherein the library further comprises a parameter associated with minimally required external air supply.

23. The method of claim 12, wherein the step of executing the ventilation command further comprises maintaining a predetermined air pressure differential between portions of the enclosed structure.

24. The method of claim 23, wherein maintaining predetermined air pressure differential between portions of the enclosed structure comprises controlling exhaust ventilation air flow and the fresh air airflow.

25. The method of claim 12, wherein to dynamic threshold is varied as a function of an expected energy requirement by the fresh air system.

26. The method of claim 25, further comprising calculating the expected energy requirement based on forecasted weather parameters.

27. The method of claim 12, wherein the step of executing the ventilation command further comprises ventilating unoccupied portions of the enclosed structures, or the whole unoccupied enclosed structure.

28. The method of claim 12, further comprising: activating, deactivating and tuning components of the HVAC system to improve energy efficiency.

29. The method of claim 28, wherein the HVAC system's components are at least one of: chillers, heat-pumps, fan coils, heating coils, heat exchangers, cooling towers, water pumps, motors, fans, and compressors.

30. The method of claim 12, wherein the step of executing the ventilation command further comprises controlling at least one of: baffles, and dumpers each affecting outdoor air flow distribution between different sub-zones in the structure.

31. The method of claim 28, further comprising: a. detecting a faulty component of the HVAC system, or an improper distribution of fresh air flow in the enclosed structure or in a portion thereof; and b. upon detecting a faulty component, issuing an alert.

32. The method of claim 28, wherein the energy efficiency improved is at least one of: Watts, coefficient of performance (COP), and energy efficiency ratio (EER).

33. A non-transitory computer readable storage media and a library comprising: a second ventilation-associated parameter ($VAP_2$), related to the outside of the multi-storied structure, a third ventilation-associated parameter ($VAP_3$), related to temporal ventilation history, air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process objects with dynamic threshold, linked to the second, and third ventilation-associated parameters as well as to the heating and air-conditioning associated parameter related to the internal and external temperature of the multi-storied structure, the processor-readable media having a set of executable instructions, which, when executed; are configured to cause a processor to:
  a. receive a ventilation request from a heating, ventilation and air conditioning (HVAC) system;
  b. responsive to the ventilation request, select a set of operations configured to achieve a predetermined optimization objective from the plurality of master process objects in the library;
  c. associate the selected set of operations with the ventilation request;
  d. create a set of process commands within the ventilation request;
  e. form a ventilation command, wherein the set of master process objects in the library are linked to the ventilation command without copying the set of master process objects into the ventilation command; and
  f. execute the set of ventilation associated master process objects in the ventilation command.

34. The non-transitory computer-readable storage media of claim 33, wherein a set of master process objects is configured to be selectable from the plurality of master process objects in the library using a rule-based algorithm.

35. The non-transitory computer-readable storage media of claim 34, wherein the optimization Objective is comprised of at least one of a plurality sub-goals of: reduction of concentration of indoor and/or outdoor sourced pollutants, maximizing incoming air flow, maintaining internal temperature range, minimizing a breach period, minimizing energy requirement by the HVAC system, or a combination of sub-goals comprising the foregoing.

36. The non-transitory computer-readable storage media of claim 35, wherein the library further comprises: a. a fourth ventilation-associated parameter (VAP.sub.4), related to a hub encompassing the enclosure; and b. a fifth ventilation-associated parameter (VAP.sub.5), designating the location of the enclosure within the hub, wherein the library further comprises a plurality of master process objects linked to the fourth, and fifth ventilation-associated parameters.

37. The non-transitory computer-readable storage media of claim 33, wherein, when executed, the processor is further configured to modify control information using a user input.

38. The processor readable media of claim 37, wherein the user input comprise: feedback input from the HVAC system and/or sensors measuring its performance, input from sensors monitoring levels of contaminants at specified locations, or their combination.

39. The non-transitory computer-readable storage media of claim 33, wherein, when executed, the processor readable media is further configured to cause the processor to determine a wet bulb temperature and limit air flow so as to prevent condensation of moisture in the HVAC system.

40. A method for adaptive optimization of heating, ventilation and air conditioning (HVAC) process in a multi-storied structure implementable in a system comprising the multi-storied structure, a heating, ventilation and air conditioning (HVAC) system, a processing module in communication with a non-transitory memory storing thereon a processor-readable media and a library comprising: a second ventilation-associated parameter ($VAP_2$), related to the outside of the multi-storied structure, a third ventilation-associated parameter ($VAP_3$), related to temporal ventilation history, an air-conditioning associated parameter ($HACAP_6$), related to an internal temperature of the multi-storied structure and an air-conditioning associated parameter ($HACAP_7$), related to an external temperature of the multi-storied structure, wherein the library further comprises a plurality of master process Objects comprised of a plurality of sub-goals, with a dynamic threshold value, the dynamic threshold value linked to the second, and third ventilation-associated parameters as well as to the heating and air-conditioning associated parameter related to the internal and external temperature of the multi-storied structure; the method comprising: selecting a historical dataset comprising a first set of forecast pollutant values received from one or more predictive forecast statistical models and a first set of actual pollutant values received from one or more measurements of the pollutants; generating one or more variants of machine learning models to model performance of the one or more predictive forecast models by training the one or more variants of the machine learning models on the historical dataset; receiving a current dataset comprising a second set of forecast pollutant values derived from the one or more predictive forecast models and a second set of actual pollutant values derived from the one or more measurements of the pollutants; correlating the current dataset with the historical dataset to adaptively obtain a filtered historical dataset; selecting the one or more variants of the machine learning models trained on the historical dataset and evaluating them on the filtered historical dataset to assign weights to each of the one or more variants of the machine learning models and their outputs; and deriving a statistical model in the form of an optimal combination function to determine at least one combined forecast pollutant value by combining weights assigned to each of the one or more variants of the machine learning models trained based on the evaluating of the one or more variants of the machine learning models on the filtered historical dataset and the outputs of the each of the one or more variants of machine learning models trained on the historical dataset, wherein the selecting, the generating, the receiving; the correlating, the evaluating and the deriving are performed by the processor using computer-readable instructions stored in the non-transitory memory.

41. The method of claim 40, wherein the one or more predictive forecast models include a supervisory control and data acquisition (SCADA) model, a physical model including numerical pollutant reaction kinetics prediction model, a statistical model, a machine learning model, an alternate forecast model, or combinations thereof.

42. The method of claim 40, wherein the one or more variants of the machine learning models include Artificial Neural Networks (ANNs), basis function models, kernel methods, support vector machines, decision trees, variation methods, distribution sampling methods, ensemble methods, graphical models, search methods, or combinations thereof.

* * * * *